US011759766B1

(12) United States Patent
Vaidya et al.

(10) Patent No.: US 11,759,766 B1
(45) Date of Patent: Sep. 19, 2023

(54) REDUCING SULFUR EMISSIONS OF SULFUR RECOVERY PLANT BY A SORPTION BASED SO₂ SELECTIVE CROSSLINKED POLYIONIC LIQUID SYSTEM

(71) Applicant: Saudi Arabian Oil Company, Dhahran (SA)

(72) Inventors: Milind M. Vaidya, Dhahran (SA); Sebastien A. Duval, Dhahran (SA); Veera Venkata R. Tammana, Dhahran (SA); Georgios Lithoxoos, Dhahran (SA); Aadesh Harale, Dhahran (SA); Feras Hamad, Dhahran (SA); Faisal D. Al-Otaibi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/950,719

(22) Filed: Sep. 22, 2022

(30) Foreign Application Priority Data

Aug. 26, 2022 (GR) .............................. 20220100711

(51) Int. Cl.
| | | |
|---|---|---|
| *C01B 17/48* | (2006.01) | |
| *B01J 20/26* | (2006.01) | |
| *B01J 20/28* | (2006.01) | |
| *B01D 53/14* | (2006.01) | |
| *B01D 53/18* | (2006.01) | |
| *B01D 53/50* | (2006.01) | |
| *B01D 53/78* | (2006.01) | |

(52) U.S. Cl.
CPC ........ *B01J 20/267* (2013.01); *B01D 53/1418* (2013.01); *B01D 53/1481* (2013.01); *B01D 53/1493* (2013.01); *B01D 53/18* (2013.01); *B01D 53/507* (2013.01); *B01D 53/78* (2013.01); *B01J 20/262* (2013.01); *B01J 20/28026* (2013.01); *C01B 17/48* (2013.01); *B01D 2252/30* (2013.01)

(58) Field of Classification Search
CPC ....... C01B 17/48; B01J 20/267; B01J 20/262; B01J 20/28026; B01D 53/1481; B01D 53/1418; B01D 53/18; B01D 53/507; B01D 53/78; B01D 53/1493; B01D 2252/30
See application file for complete search history.

(56) References Cited

U.S. PATENT DOCUMENTS

| | | |
|---|---|---|
| 8,043,418 B2 | 10/2011 | Ruud et al. |
| 10,106,410 B2 | 10/2018 | Ballaguet et al. |
| 10,106,411 B2 | 10/2018 | Ballaguet et al. |
| 10,479,684 B2 | 11/2019 | Ballaguet et al. |
| 10,508,033 B2 | 12/2019 | Ballaguet et al. |
| 2012/0186446 A1* | 7/2012 | Bara .................. C09K 19/3823 96/5 |
| 2015/0314234 A1* | 11/2015 | Sasson .................. B01D 53/96 423/242.6 |
| 2019/0010052 A1 | 1/2019 | Ballaguet et al. |
| 2019/0016598 A1 | 1/2019 | Ballaguet et al. |

FOREIGN PATENT DOCUMENTS

| | | |
|---|---|---|
| WO | WO 2015074739 | 5/2015 |
| WO | WO 2016069722 | 5/2016 |
| WO | WO 2018022756 | 2/2018 |
| WO | WO 2019171409 | 9/2019 |

OTHER PUBLICATIONS

An et al., "Synthesis and SO2 Absorption/Desorption Properties of Poly(1,1,3,3-tetramethylguanidine acrylate)," Macromolecules, Apr. 2007, 40(9):3388-3393, 6 pages.
Ballaguet et al., "Sulphur Cycle," Encyclopedia of Hydrocarbons, Istituto Della Enciclopedia Italiana Fondata Da Giovanni Treccani Spa, vol. II Refining and Petrochemicals, Chapter 3.2, 2006, 43 pages.
Cui et al., "Ultrahigh and Selective SO2 Uptake in Inorganic Anion-Pillared Hybrid Porous Materials," Advanced Materials, May 2017, 29(28):1606929, 9 pages.
Froschauer et al., "No Matter of Course: Ionic Liquids as SO2-Selective Gas Absorbers," Lenzinger Berichte, Jan. 2013, 91:30-43, 15 pages.
Huang et al., "Facilitated separation of CO2 and SO2 through supported liquid membranes using carboxylate-based ionic liquids," Journal of Membrane Science, Dec. 2014, 471:227-236, 10 pages.
Kikkinides et al., "Gas Separation and Purification by Polymeric Adsorbents: Flue Gas Desulfurization and S02 Recovery with Styrenic Polymer," Ind. Eng. Chem. Res., Oct. 1993, 32(10):2365-2372, 8 pages.
Lee et al., "Diamine-Anchored Polystyrene Resins for Reversible SO2 Adsorption," ACS Sustainable Chem. Eng., Feb. 2016, 4(4):2012-2019, 8 pages.
Ren et al., "Ionic liquids: Functionalization and absorption of SO2," Green Energy & Environment, Jul. 2018, 3(3):179-190, 12 pages.
Shell Global Solutions International BV, "Cansolv Technologies Inc. SO2 Scrubbing System," fact sheet, 2010, 2 pages.
Sulfur recovery, Emissions Factors & AP 42, Compilation of Air Pollutant Emission Factors, Chapter 8.13, U.S. Environmental Protection Agency, Apr. 2015, 9 pages.
Tailor et al., "Supported Polytertiary Amines: Highly Efficient and Selective SO2 Adsorbents," Environ. Sci. Technol., Jan. 2014, 48(3):2025-2034, 10 pages.
Wu et al., "Preparation and SO2 Absorption /Desorption Properties of Crosslinked Poly(1,1,3,3-Tetramethylguanidine Acrylate) Porous Particles," Macromolecular Rapid Communications, Nov. 2006, 27(22):1949-1954, 6 pages.
www.digitalrefining.com [online], "Labsorb: A regenerable wet scrubbing process for controlling SO2 emissions," Jan. 2001, retrieved on Jan. 11, 2022, retrieved from URL<https://www.digitalrefining.com/article/1000818/labsorb-a-regenerable-wet-scrubbing-process-for-controlling-so2-emissions#.Yd3Ha9HMKUk>, 2 pages.

(Continued)

*Primary Examiner* — Timothy C Vanoy
(74) *Attorney, Agent, or Firm* — Fish & Richardson P.C.

(57) ABSTRACT

This invention relates to a system and method for improving sulfur recovery from a Claus unit. More specifically, this invention provides a sorption based SO₂ selective crosslinked polyionic liquid system and method for treating acid gas streams and minimizing sulfur dioxide emissions therefrom.

20 Claims, 5 Drawing Sheets

(56) References Cited

OTHER PUBLICATIONS

Xia et al., "Efficient, Selective, and Reversible SO2 Capture with Highly Crosslinked Ionic Microgels via a Selective Swelling Mechanism," Advanced Functional Materials, Jan. 2018, 28(13):1704292, 10 pages.

Zhao et al., "SO2 Absorption by Carboxylate Anion-Based Task-Specific Ionic Liquids: Effect of Solvents and Mechanism," Ind. Eng. Chem. Res., Dec. 2016, 55(50):12919-12928, 10 pages.

* cited by examiner

REDUCING SULFUR EMISSIONS OF SULFUR RECOVERY PLANT BY A SORPTION BASED $SO_2$ SELECTIVE CROSSLINKED POLYIONIC LIQUID SYSTEM

CROSS-REFERENCE TO RELATED PATENT APPLICATION

This application claims the benefit of priority to Greek Application No. 20220100711, filed on Aug. 26, 2022, the entire contents of which are incorporated by reference herein.

TECHNICAL FIELD

This invention relates to a system and method for improving sulfur recovery from a Claus unit. More specifically, this invention provides a sorption based $SO_2$ selective crosslinked polyionic liquid system and method for treating acid gas streams and minimizing sulfur dioxide emissions therefrom.

BACKGROUND

With more stringent fuel regulations and increasing environmental concerns, together with the need to process sourer crude oils and natural gases, sulfur recovery has become one of the leading issues in emission reduction. Elemental sulfur is the ultimate state of recovery of the sulfur species. The modified Claus process is the main industrial process to recover sulfur from $H_2S$ or sour acid gas streams. The modified Claus process is a combination of thermal and catalytic process that is used for converting gaseous hydrogen sulfide ($H_2S$) into elemental sulfur (S), and the corresponding unit is referred to as a Sulfur Recovery Unit (SRU) (FIG. 1).

Claus unit feed gases have a wide range of compositions. Most of the feed gases originate from absorption processes using various solvents to extract hydrogen sulfide from the by-product gases of, for example, petroleum refining and natural gas processing. Different versions of the modified Claus process arrangement can be used depending on the composition of the feed gas.

Claus sulfur recovery plants with three catalytic reactors can achieve an overall conversion of hydrogen sulfide into product sulfur of 96-98% depending on the feed gas composition. Up to 99.9% conversion of hydrogen sulfide into product sulfur can be achieved by adding a Tail Gas treatment unit (a polishing unit). With such a tail gas clean-up process, sulfur recovery rates of nearly 100% are attainable with approximately 10 ppmV residual $SO_2$ in the exhaust gas.

There are a number of methods used to remove the residual $SO_2$. The LABSORB™ process utilizes an inorganic regenerable scrubbing reagent to react with $SO_2$. Reagent, rich in $SO_2$ from the scrubber, is processed in a regeneration unit to strip off the captured $SO_2$, producing fresh reagent for scrubbing. The $SO_2$ removed from the reagent is discharged as concentrated/pure $SO_2$ (90+%) and can be sent to the front end of a Claus plant (or sulfuric acid plant) for recovery. Solids are removed from the flue gas in a pre-scrubbing section and de-watered in a system similar to what is used in the purge treatment unit of caustic soda based FCCU scrubbing system. Caustic soda (NaOH) and phosphoric acid ($H_3PO_4$) are used for the buffer and small additions are required to make up for small buffer loses. Low pressure steam is used for buffer regeneration in single or double effects evaporation loop. The LABSORB™ process produces a minimum amount of waste for disposal, while recovered $SO_2$ can be converted to saleable products such as elemental sulfur, sulfuric acid or liquid $SO_2$.

The Cansolv® $SO_2$ Scrubbing System is very similar to the well-known amine treatment process for removal of $H_2S$ and $CO_2$ from refinery streams and natural gas. The gas is contacted counter currently in the absorption tower, where the Cansolv® solvent absorbs the sulfur dioxide, reducing the effluent gas down to the design $SO_2$ concentration. The rich amine is regenerated in the stripping tower. Once regenerated, the solvent is recirculated to the absorption tower to pick up additional sulfur dioxide. Emissions as low as 10 ppmV can be achieved. The main part of the Cansolv® process consists of a structured packing absorption tower and a regeneration tower, also containing structured packing, equipped with a reboiler and an overhead condenser. Associated peripheral equipment consists of process pumps, heat exchangers, and a process particulate filter. The unit also includes an electro dialysis solvent purification unit. Materials of construction are adjusted to handle the lower pH values resulting from the higher acidity of $SO_2$ compared to $H_2S$ and $CO_2$.

In the Clausmaster® process hot $SO_2$ gas is then cooled by a DynaWave® Wet Scrubber and gas cooling tower. $SO_2$ removal occurs only after the gas has been quenched. The acid gases are absorbed into the scrubbing liquid. Once absorbed, the acid gases react with the reagent, forming reaction by-products, which then must be removed from the clean gas.

After passing through the proprietary $SO_2$ physical absorbent, clean gas exits the stack, and the $SO_2$ is stripped from the $SO_2$ loaded absorbent in the stripping tower. Concentrated $SO_2$ is recycled back to the Claus sulfur recovery plant where it is converted to sulfur. The recycled $SO_2$ reduces the air and fuel requirements for a typical Claus plant and $H_2S$ tail gas system.

The Clintox® or Solinox® process is a physical scrubber process. High sulfur recovery is achieved by recycling unreacted sulfur compounds. The completely oxidized tail gas containing only $SO_2$ is fed to a physical scrubbing tower. The concentrated $SO_2$ is stripped from the solvent in a second column and sent back to the Claus inlet. With such a tail gas clean-up process, sulfur recovery rates of nearly 100% are attainable with approximately 80 ppmV residual $SO_2$ in the exhaust gas.

Another type of scrubbing system uses caustic/sodium sulfite solution to capture $SO_2$ from catalytically oxidized sulfur species such as in Selectox process. The Selectox process, licensed by UOP, processes lean acid gas over a catalyst, which oxidizes the $H_2S$ to $SO_2$ at a temperature of about 700° F. This is convenient for low $SO_2$ emissions as produced sodium sulfite has to be disposed in the waste water system.

This invention describes processes to improve sulfur recovery operations, which consists of a series of gas separation sorption/desorption-based processes utilizing $SO_2$ selective crosslinked polyionic liquids to remove $SO_2$ from tail gas and economically produce highly enriched $SO_2$ air for Claus plants increasing sulfur recovery unit capacity (FIG. 2 and FIG. 3).

SUMMARY

Disclosed herein is a method for removing $SO_2$ from a sulfur recovery unit (SRU) tail gas stream, comprising:

a) introducing the SRU tail gas stream to an oxidizer to produce a sorbent feed;
b) introducing the sorbent feed to a sorbent structure comprising a $SO_2$ selective crosslinked polyionic liquid;
c) allowing the sorbent feed to contact a feed side of the sorbent such that the $SO_2$ is sorbed, and the portion of the sorbent feed that is not sorbed forms $SO_2$ depleted gases;
d) collecting the $SO_2$ depleted gases to produce a stack feed;
e) supplying hot air or nitrogen to the regenerate the sorbent to produce a $SO_2$ rich stream; and
f) sending the $SO_2$ rich stream to the SRU;
wherein the crosslinked polyionic liquid is a random copolymer of Formula I:

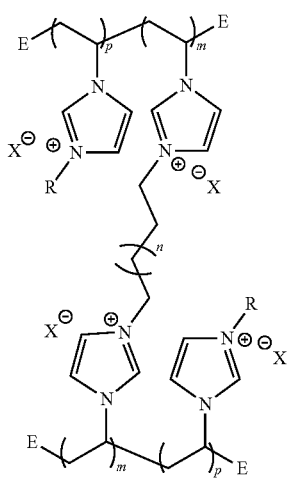

wherein:
each E is independently a polymer end group;
R is $C_{2-6}$ alkyl optionally substituted with $R^1$;
$R^1$ is phenyl, —O-phenyl, —OC(=O)$CH_3$, —SC(=O)$CH_3$, or

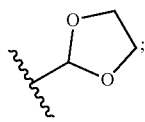 [SMILES: *C1OCCO1]

each X is independently Br, bis((trifluoromethyl)sulfonyl)amide, or SCN;
n is 0, 1, 3, or 5;
each m is independently 10-1000; and
each p is independently 0-1000.

Also disclosed herein is a system for removing $SO_2$ from a sulfur recovery unit (SRU) tail gas stream, comprising:
a) a sorbent feed generated from oxidation of the SRU tail gas stream;
b) a sorbent structure comprising a $SO_2$ selective crosslinked polyionic liquid;
c) a stack feed comprising the SRU tail gas component depleted in $SO_2$ gases;
d) a hot air or $N_2$ supply for desorption $SO_2$ that forms a $SO_2$ rich stream; and
e) an SRU to receive the $SO_2$ rich stream;
wherein the crosslinked polyionic liquid is a random copolymer of Formula I:

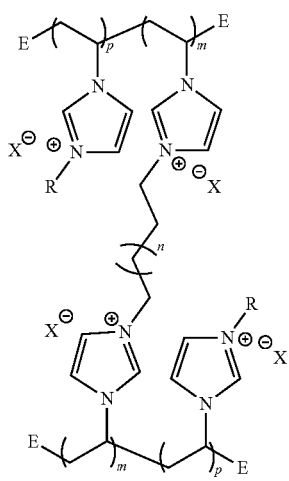

wherein:
each E is independently a polymer end group;
R is $C_{2-6}$ alkyl optionally substituted with $R^1$;
$R^1$ is phenyl, —O-phenyl, —OC(=O)$CH_3$, —SC(=O)$CH_3$, or

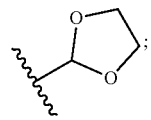

each X is independently Br, bis((trifluoromethyl)sulfonyl)amide, or SCN;
n is 0, 1, 3, or 5;
each m is independently 10-1000; and
each p is independently 0-1000.

Also disclosed herein is a crosslinked polyionic liquid of Formula I:

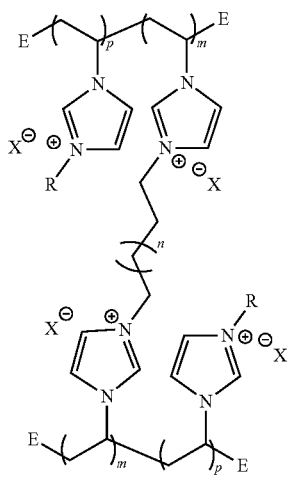

wherein:
each E is independently a polymer end group;
R is $C_{2-6}$ alkyl optionally substituted with $R^1$;
$R^1$ is phenyl, —O-phenyl, —OC(=O)$CH_3$, —SC(=O)$CH_3$, or

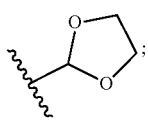 [SMILES: *C1OCCO1]

each X is independently Br, bis((trifluoromethyl)sulfonyl) amide, or SCN;
n is 0, 1, 3, or 5;
each m is independently 10-1000; and
each p is independently 0-1000;
wherein the crosslinked polyionic liquid is a random copolymer, and
wherein the crosslinked polyionic liquid has a $SO_2/CO_2$ selectivity of at least about 3.

Also disclosed herein is a sorbent comprising the crosslinked polyionic liquid of Formula I:

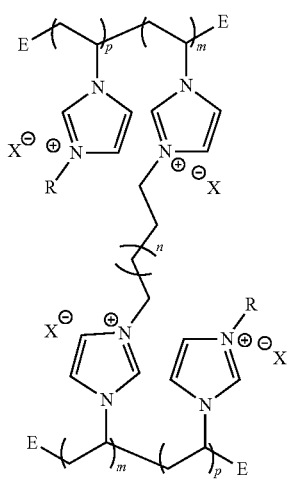

I wherein:
E is a polymer end group;
R is $C_{2-6}$ alkyl optionally substituted with $R^1$;
$R^1$ is phenyl, —O-phenyl, —OC(=O)CH$_3$, —SC(=O)CH$_3$, or

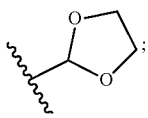 [SMILES: *C1OCCO1]

each X is independently Br, bis((trifluoromethyl)sulfonyl) amide, or SCN;
n is 0, 1, 3, or 5;
each m is independently 10-1000; and
each p is independently 0-1000;
wherein the crosslinked polyionic liquid is a random copolymer, and
wherein the sorbent has a $SO_2/CO_2$ selectivity of at least about 3.

DETAILED DESCRIPTION

Figure 1:
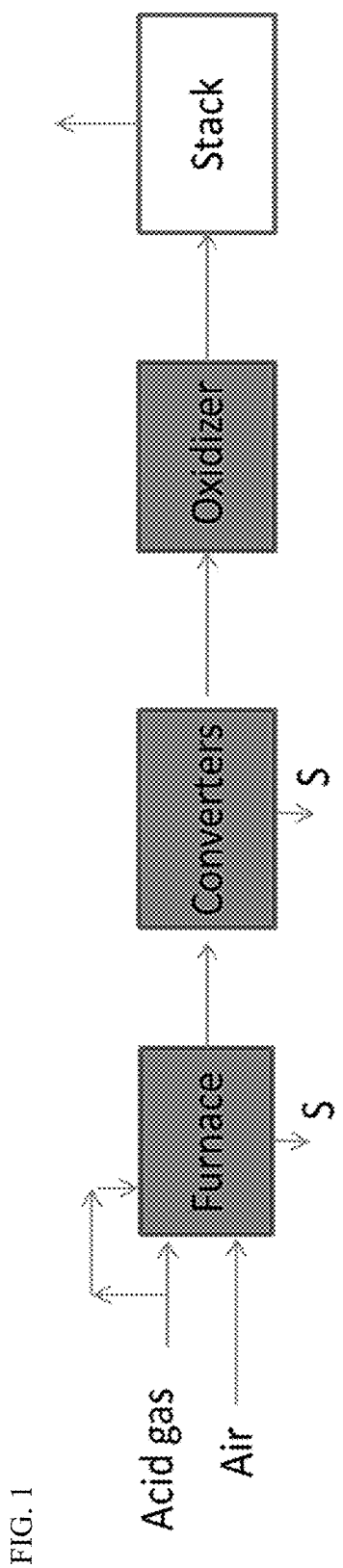
FIG. 1 is a diagram of a process for a sulfur recovery unit.

Disclosed herein are methods for removing $SO_2$ from a sulfur recovery unit (SRU) tail gas stream, comprising introducing tail gas stream from the sulfur recovery unit (SRU) to an oxidizer to produce a sorbent feed, introducing the sorbent feed to a sorbent structure comprising a crosslinked polyionic liquid, allowing the sorbent feed to contact a feed side of the sorbent such that the $SO_2$ is sorbed, collecting the $SO_2$ depleted permeate gases to produce a stack feed, supplying hot air to the sorbent to produce a $SO_2$ rich stream, and sending the $SO_2$ rich stream to the SRU.

Disclosed herein are crosslinked polyionic liquid that form three dimensional networks, which have stability and applicability to be utilized in industrial applications. Crosslinked polyionic liquids can be formed by polymerizing of ionic liquid divinyl monomers or polymerizing ionic liquids divinyl monomers with ionic liquid vinyl monomers, preferably with similar counter ion. Polymers comprising both ionic liquid divinyl monomers and ionic liquid vinyl monomers facilitate mass transfer of gases because of the more open crosslinked network. This network can also be varied by modifying the identity of the ionic liquid divinyl or ionic liquid vinyl monomers. These crosslinked polyionic liquids disclosed herein sorb $SO_2$ and selectively exclude $CO_2$ due to the pKa effect of the tertiary nitrogen in the structure and the pKa control achieved by counter ion. This results in high $SO_2/CO_2$ selectivity and $SO_2/N_2$ selectivity, which allows for effective separation of $SO_2$ from $CO_2$ from the tail gas of the Claus plant or any flue gas containing $SO_2$ and $CO_2$. Crosslinked polyionic liquids form industrially usable robust structures. Crosslinked polyionic liquids can be in the form of foam factors, which can optimize mass transfer and surface area thus making the process industrially feasible. Form factors include, but are not limited to, nanoporous microporous closed cell foams, nanoporous or microporous microbeads or nanobead, nanoporous or microporous reinforced microbeads or nanobeads, and thin nanoporous or microporous coatings In some embodiments, provided herein is a method for removing $SO_2$ from a sulfur recovery unit (SRU) tail gas stream comprising:
a) introducing the SRU tail gas stream to an oxidizer to produce a sorbent feed;
b) introducing the sorbent feed to a sorbent structure comprising a $SO_2$ selective crosslinked polyionic liquid;
c) allowing the sorbent feed to contact the sorbent such that the $SO_2$ is sorbed, and the portion of the sorbent feed that is not sorbed forms $SO_2$ depleted gases;
d) collecting the $SO_2$ depleted gases to produce a stack feed;
e) supplying hot air or nitrogen to the retentate side of the sorbent to produce a $SO_2$ rich stream; and
f) sending the $SO_2$ rich stream to the SRU;
wherein the crosslinked polyionic liquid is a random copolymer of Formula I:

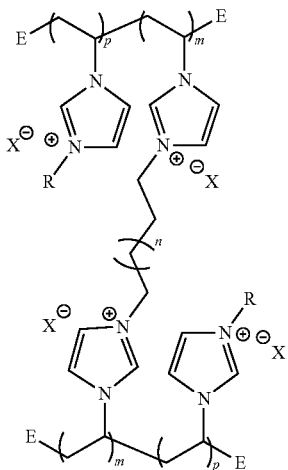

wherein:
each E is independently a polymer end group;
R is $C_{2-6}$ alkyl optionally substituted with $R^1$;
$R^1$ is phenyl, —O-phenyl, —OC(=O)CH$_3$, —SC(=O)CH$_3$, or

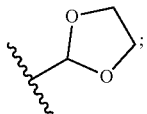 [SMILES: *C1OCCO1]

each X is independently Br, bis((trifluoromethyl)sulfonyl)amide, or SCN;
n is 0, 1, 3, or 5;
each m is independently 10-1000; and
each p is independently 0-1000.

In some embodiments, the tail gas stream comprises $CO_2$, $H_2O$, $N_2$, and $O_2$.

In some embodiments, the sorbent has a $SO_2/CO_2$ selectivity of at least about 3, at least about 10, at least about 50, at least about 100, or at least about 500. In some embodiments, the sorbent has a $SO_2/N_2$ selectivity of at least about 10, at least about 50, at least about 100, or at least about 500. In some embodiments, the sorbent has a $SO_2/CH_4$ selectivity of at least about 10, at least about 50, at least about 100, or at least about 200.

In some embodiments, the sorbent has a $CO_2$ uptake capacity of about 0.1 mg/g to about 1 mg/g, about 1 mg/g to about 10 mg/g, or about 10 mg/g to about 50 mg/g. In some embodiments, the sorbent has a $N_2$ uptake capacity of about 0.1 mg/g to about 1 mg/g, about 1 mg/g to about 10 mg/g, or about 10 mg/g to about 50 mg/g.

In some embodiments, the crosslinked polyionic liquid is stacked and utilized in a sorption column to improve the capacity of $SO_2$ sorption, and the rate of the sorption for the mass transfer of the gases.

In some embodiments, the crosslinked polyionic liquids can be in the form of fibers packed in a fiber vessel to create a large surface/volume ratio. Fiber can be multiple layer: crosslinked polyionic liquids for the core and porous PDMS (polydimethylsiloxane) shell for structural strength. Fiber can be metallic fibers coated with the crosslinked polyionic liquids. In some embodiments, the crosslinked polyionic liquids are using to coat rings. The rings can be Raschig rings, Lessing rings, Bialecki rings, Dixon rings, or Pall rings.

In some embodiments, the crosslinked polyionic liquid is in the form of microporous beads. In some embodiments, the crosslinked polyionic liquid is in the form of a micron size mesoporous particle that creates channels for improving the mass transfer of the gas by means of freeze drying. In some embodiments, the crosslinked polyionic liquid is on mesoporous silica, mole sieves, or zeolites to create a form factor, which can be stacked. In some embodiments, the silica is precipitated silica, colloidal silica, or fumed silica.

In some embodiments, the crosslinked polyionic liquids form a thin coating. In some embodiments, the thin coating is a mesoporous thin film coating in a planar form of sheets. In some embodiments, the sorbent comprises mesoporous submicron and micron thin flat sheets coated in the crosslinked polyionic liquid. In some embodiments, the sorbent comprises mesoporous submicron thin flat sheets coated in the crosslinked polyionic liquid. In some embodiments, the sorbent comprises mesoporous micron thin flat sheets coated in the crosslinked polyionic liquid.

In some embodiments, the crosslinked polyionic liquid is blended with polyethylene oxide polymers. In some embodiments, the crosslinked polyionic liquid blended with polyethylene oxide polymers is in the form of a micron size mesoporous particle form factor.

In some embodiments, the crosslinked polyionic liquid further comprises polyethylene oxide. In some embodiments, the crosslinked polyionic liquid comprising polyethylene oxide is in the form of a micron size mesoporous particle form factor. In some embodiments, the crosslinked polyionic liquid comprising polyethylene oxide forms micron to 100 micron size mesoporous composite coatings. In some embodiments, the crosslinked polyionic liquid comprising polyethylene oxide forms sub-micron or micron sized mesoporous beads.

In some embodiments, the crosslinked polyionic liquid is in the form of a closed cell and open cell sponge form factor. In some embodiments, the crosslinked polyionic liquid is in the form of a mesoporous submicron and micron high/medium density closed cell and open cell sponge form factor.

In some embodiments, R is $C_{2-10}$ alkyl. In some embodiments, R is $C_{2-6}$ alkyl. In some embodiments, R is $C_1$ alkyl. In some embodiments, R is $C_2$ alkyl. In some embodiments, R is $C_3$ alkyl. In some embodiments, R is $C_4$ alkyl. In some embodiments, R is $C_5$ alkyl. In some embodiments, R is $C_6$ alkyl.

In some embodiments, R is $C_{2-6}$ alkyl substituted with $R^1$. In some embodiments, R is $C_1$ alkyl substituted with $R^1$. In some embodiments, R is $C_2$ alkyl substituted with $R^1$. In some embodiments, R is $C_3$ alkyl substituted with $R^1$. In some embodiments, R is $C_4$ alkyl substituted with $R^1$. In some embodiments, R is $C_5$ alkyl substituted with $R^1$. In some embodiments, R is $C_6$ alkyl substituted with $R^1$.

In some embodiments, $R^1$ is phenyl. In some embodiments, $R^1$ is —O-phenyl. In some embodiments, $R^1$ is —OC(=O)CH$_3$. In some embodiments, $R^1$ is —SC(=O)CH$_3$. In some embodiments, $R^1$ is

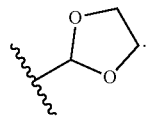

In some embodiments, X is Br. In some embodiments, X is SCN. In some embodiments, X is bis((trifluoromethyl)sulfonyl) amide.

In some embodiments, n is 0. In some embodiments, n is 1. In some embodiments, n is 3. In some embodiments, n is 5.

In some embodiments, m is 10-900. In some embodiments, m is 10-700. In some embodiments, m is 10-600. In some embodiments, m is 10-500. In some embodiments, m is 2-4. In some embodiments, m is 10-400.

In some embodiments, p is 300-1000. In some embodiments, p is 400-1000. In some embodiments, p is 400-900. In some embodiments, p is 400-800. In some embodiments, p is 500-700. In some embodiments, p is 600-1000.

In some embodiments, the crosslinked polyionic liquid is D[VImC6]Br Polymer, Porous PIL P(3DVB-[VImC2]Br), [VImC4]Br Low crosslinked polymer with divinyl D[VImC6]Br or D[VImC6]SCN, or D[VImC6]SCN Polymer. In some embodiments, the crosslinked polyionic liquid is a polymer of [VImC4]Br with 2% to 10% by wt D[VImC6]Br or D[VImC6]SCN. In some embodiments, the crosslinked polyionic liquid is a polymer of [VImC4]Br with 2% to 10% by mol D[VImC6]Br or D[VImC6]SCN.

In some embodiments, a porous PIL is formed in the form factor by freeze drying process and/or with other processes.

In some embodiments, the hot air or nitrogen comprises a partial vacuum or a sweep.

In some embodiments, the $SO_2$ rich stream that is sent to the SRU is used as the "air" stream in the Claus burner.

System

Also provided herein is a system for removing $SO_2$ from a sulfur recovery unit (SRU) tail gas stream, comprising:

a) a sorbent feed generated from oxidation of the SRU tail gas stream;

b) a sorbent structure comprising a crosslinked polyionic liquid;

c) a stack feed comprising the SRU tail gas component depleted in $SO_2$ gases;

d) a hot air supply to the sorbent that forms a $SO_2$ rich stream by desorbing $SO_2$; and e) an SRU to receive the $SO_2$ rich stream;

wherein the crosslinked polyionic liquid is a random copolymer of Formula I:

TABLE A

| Compound abbreviations and structures | |
|---|---|
| D[VImC6]Br | 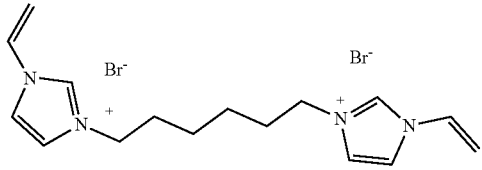 |
| D[VImC6]SCN | 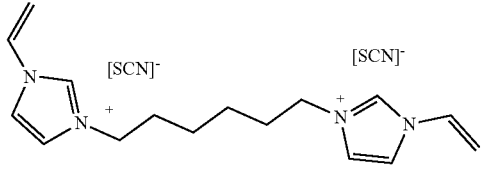 |
| [VImC4]Br | 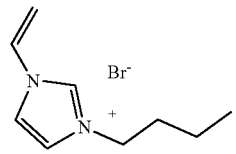 |
| P(3DVB-[VImC2]Br) | 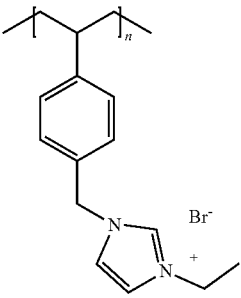 |

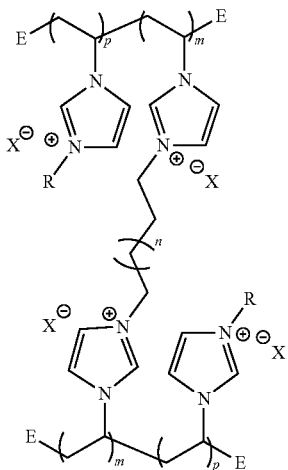

wherein:
each E is independently a polymer end group;
R is $C_{2-6}$ alkyl optionally substituted with $R^1$;
$R^1$ is phenyl, —O-phenyl, —OC(=O)CH$_3$, —SC(=O)CH$_3$, or

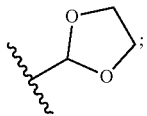 [SMILES: *C1OCCO1]

each X is independently Br, bis((trifluoromethyl)sulfonyl)amide, or SCN;
n is 0, 1, 3, or 5;
each m is independently 10-1000; and
each p is independently 0-1000.

In some embodiments, the tail gas stream comprises $CO_2$, $H_2O$, $N_2$, and $O_2$.

In some embodiments, the sorbent has a $SO_2/CO_2$ selectivity of at least about 3, at least about 10, at least about 50, at least about 100, or at least about 500. In some embodiments, the sorbent has a $SO_2/N_2$ selectivity of at least about 10, at least about 50, at least about 100, or at least about 500. In some embodiments, the sorbent has a $SO_2/CH_4$ selectivity of at least about 10, at least about 50, at least about 100, or at least about 200.

In some embodiments, the sorbent has a $CO_2$ uptake capacity of about 0.1 mg/g to about 1 mg/g, about 1 mg/g to about 10 mg/g, or about 10 mg/g to about 50 mg/g. In some embodiments, the sorbent has a $N_2$ uptake capacity of about 0.1 mg/g to about 1 mg/g, about 1 mg/g to about 10 mg/g, or about 10 mg/g to about 50 mg/g.

In some embodiments, the crosslinked polyionic liquid is stacked and utilized in a sorption column to improve the capacity of $SO_2$ sorption, and the rate of the sorption for the mass transfer of the gases.

In some embodiments, the crosslinked polyionic liquids can be in the form of fibers packed in a fiber vessel to create a large surface/volume ratio. Fiber can be multiple layer: crosslinked polyionic liquids for the core and porous PDMS (polydimethylsiloxane) shell for structural strength. Fiber can be metallic fibers coated with the crosslinked polyionic liquids. In some embodiments, the crosslinked polyionic liquids are using to coat rings. The rings can be Raschig rings, Lessing rings, Bialecki rings, Dixon rings, or Pall rings.

In some embodiments, the crosslinked polyionic liquid is in the form of microporous beads. In some embodiments, the crosslinked polyionic liquid is in the form of a micron size mesoporous particle that creates channels for improving the mass transfer of the gas by means of freeze drying. In some embodiments, the crosslinked polyionic liquid is on mesoporous silica, mole sieves, or zeolites to create a form factor, which can be stacked. In some embodiments, the silica is precipitated silica, colloidal silica, or fumed silica.

In some embodiments, the crosslinked polyionic liquids form a thin coating. In some embodiments, the thin coating is a mesoporous thin film coating in a planar form of sheets. In some embodiments, the sorbent comprises mesoporous submicron and micron thin flat sheets coated in the crosslinked polyionic liquid. In some embodiments, the sorbent comprises mesoporous submicron thin flat sheets coated in the crosslinked polyionic liquid. In some embodiments, the sorbent comprises mesoporous micron thin flat sheets coated in the crosslinked polyionic liquid.

In some embodiments, the crosslinked polyionic liquid is blended with polyethylene oxide polymers. In some embodiments, the crosslinked polyionic liquid blended with polyethylene oxide polymers is in the form of a micron size mesoporous particle form factor.

In some embodiments, the crosslinked polyionic liquid further comprises polyethylene oxide. In some embodiments, the crosslinked polyionic liquid comprising polyethylene oxide is in the form of a micron size mesoporous particle form factor. In some embodiments, the crosslinked polyionic liquid comprising polyethylene oxide forms micron to 100 micron size mesoporous composite coatings. In some embodiments, the crosslinked polyionic liquid comprising polyethylene oxide forms sub-micron or micron sized mesoporous beads.

In some embodiments, the crosslinked polyionic liquid is in the form of a closed cell and open cell sponge form factor. In some embodiments, the crosslinked polyionic liquid is in the form of a mesoporous submicron and micron high/medium density closed cell and open cell sponge form factor.

In some embodiments, R is $C_{2-10}$ alkyl. In some embodiments, R is $C_{2-6}$ alkyl. In some embodiments, R is $C_1$ alkyl. In some embodiments, R is $C_2$ alkyl. In some embodiments, R is $C_3$ alkyl. In some embodiments, R is $C_4$ alkyl. In some embodiments, R is $C_5$ alkyl. In some embodiments, R is $C_6$ alkyl.

In some embodiments, R is $C_{2-6}$ alkyl substituted with $R^1$. In some embodiments, R is $C_1$ alkyl substituted with $R^1$. In some embodiments, R is $C_2$ alkyl substituted with $R^1$.

In some embodiments, R is $C_3$ alkyl substituted with $R^1$. In some embodiments, R is $C_4$ alkyl substituted with $R^1$. In some embodiments, R is $C_5$ alkyl substituted with $R^1$. In some embodiments, R is $C_6$ alkyl substituted with $R^1$.

In some embodiments, $R^1$ is phenyl. In some embodiments, $R^1$ is —O-phenyl. In some embodiments, $R^1$ is —OC(=O)CH$_3$. In some embodiments, $R^1$ is —SC(=O)CH$_3$. In some embodiments, $R^1$ is

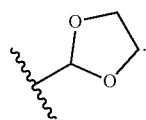 [SMILES: *C1OCCO1]

In some embodiments, X is Br. In some embodiments, X is SCN. In some embodiments, X is bis((trifluoromethyl)sulfonyl) amide.

In some embodiments, n is 0. In some embodiments, n is 1. In some embodiments, n is 3. In some embodiments, n is 5.

In some embodiments, m is 10-900. In some embodiments, m is 10-700. In some embodiments, m is 10-600. In some embodiments, m is 10-500. In some embodiments, m is 2-4. In some embodiments, m is 10-400.

In some embodiments, p is 300-1000. In some embodiments, p is 400-1000. In some embodiments, p is 400-900. In some embodiments, p is 400-800. In some embodiments, p is 500-700. In some embodiments, p is 600-1000.

In some embodiments, the crosslinked polyionic liquid is D[VImC6]Br Polymer, Porous PIL P(3DVB-[VImC2]Br), [VImC4]Br Low crosslinked polymer, or D[VImC6]SCN Polymer.

In some embodiments, the hot air or nitrogen comprises a partial vacuum or a sweep.

In some embodiments, the $SO_2$ rich stream that is sent to the SRU is used as the "air" stream in the Claus burner.

In some embodiments, the method disclosed herein removes about 99.4% to about 100%, about 99.5% to about 100%, about 99.6% to about 100%, about 99.7% to about 100%, about 99.8% to about 100%, about 99.9% to about 100%, about 99.92% to about 100%, or about 99.94% to about 100% of the sulfur from the SRU tail gas. In some embodiments, the method disclosed herein removes about 99.95% of the sulfur from the SRU tail gas.

Crosslinked Polyionic Liquid

Also provided herein is a crosslinked polyionic liquid of Formula I:

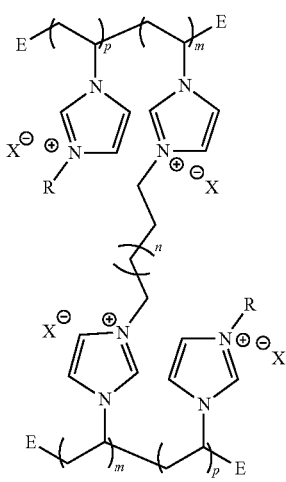

I wherein:
each E is independently a polymer end group;
R is $C_{2-6}$ alkyl optionally substituted with $R^1$;
$R^1$ is phenyl, —O-phenyl, —OC(=O)$CH_3$, —SC(=O)$CH_3$, or

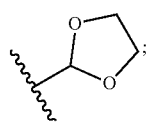 [SMILES: *C1OCCO1];

each X is independently Br, bis((trifluoromethyl)sulfonyl) amide, or SCN;
n is 0, 1, 3, or 5;
each m is independently 10-1000; and
each p is independently 0-1000;
wherein the crosslinked polyionic liquid is a random copolymer.

Also provided herein is a crosslinked polyionic liquid of Formula I:

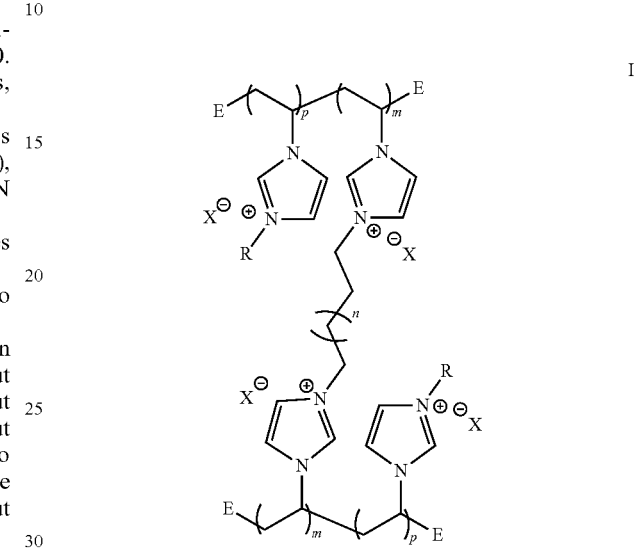

I wherein:
each E is independently a polymer end group;
R is $C_{2-6}$ alkyl optionally substituted with $R^1$;
$R^1$ is phenyl, —O-phenyl, —OC(=O)$CH_3$, —SC(=O)$CH_3$, or

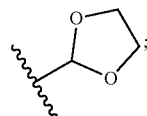;

each X is independently Br, bis((trifluoromethyl)sulfonyl) amide, or SCN;
n is 0, 1, 3, or 5;
each m is independently 10-1000; and
each p is independently 0-1000;
wherein the crosslinked polyionic liquid is a random copolymer, and
wherein the crosslinked polyionic liquid has a $SO_2/CO_2$ selectivity of at least about 3.

In some embodiments, the crosslinked polyionic liquid has a $SO_2/CO_2$ selectivity of at least about 10, at least about 50, at least about 100, or at least about 500. In some embodiments, the crosslinked polyionic liquid has a $SO_2/N_2$ selectivity of at least about 10, at least about 50, at least about 100, or at least about 500. In some embodiments, the crosslinked polyionic liquid has a $SO_2/CH_4$ selectivity of at least about 10, at least about 50, at least about 100, or at least about 200.

In some embodiments, the crosslinked polyionic liquid has a $CO_2$ uptake capacity of about 0.1 mg/g to about 1 mg/g, about 1 mg/g to about 10 mg/g, or about 10 mg/g to about 50 mg/g. In some embodiments, the crosslinked polyionic liquid has a $N_2$ uptake capacity of about 0.1 mg/g to about 1 mg/g, about 1 mg/g to about 10 mg/g, or about 10 mg/g to about 50 mg/g.

In some embodiments, the crosslinked polyionic liquid is stacked and utilized in a sorption column to improve the capacity of $SO_2$ sorption, and the rate of the sorption for the mass transfer of the gases.

In some embodiments, the crosslinked polyionic liquids can be in the form of fibers packed in a fiber vessel to create a large surface/volume ratio. Fiber can be multiple layer: crosslinked polyionic liquids for the core and porous PDMS (polydimethylsiloxane) shell for structural strength. Fiber can be metallic fibers coated with the crosslinked polyionic liquids. In some embodiments, the crosslinked polyionic liquids are using to coat rings. The rings can be Raschig rings, Lessing rings, Bialecki rings, Dixon rings, or Pall rings.

In some embodiments, the crosslinked polyionic liquid is in the form of microporous beads. In some embodiments, the crosslinked polyionic liquid is in the form of a micron size mesoporous particle that creates channels for improving the mass transfer of the gas by means of freeze drying. In some embodiments, the crosslinked polyionic liquid is on mesoporous silica, mole sieves, or zeolites to create a form factor, which can be stacked. In some embodiments, the silica is precipitated silica, colloidal silica, or fumed silica.

In some embodiments, the crosslinked polyionic liquids form a thin coating. In some embodiments, the thin coating is a mesoporous thin film coating in a planar form of sheets.

In some embodiments, the crosslinked polyionic liquid is blended with polyethylene oxide polymers. In some embodiments, the crosslinked polyionic liquid blended with polyethylene oxide polymers is in the form of a micron size mesoporous particle form factor.

In some embodiments, the crosslinked polyionic liquid further comprises polyethylene oxide. In some embodiments, the crosslinked polyionic liquid comprising polyethylene oxide is in the form of a micron size mesoporous particle form factor. In some embodiments, the crosslinked polyionic liquid comprising polyethylene oxide forms micron to 100 micron size mesoporous composite coatings. In some embodiments, the crosslinked polyionic liquid comprising polyethylene oxide forms sub-micron or micron sized mesoporous beads.

In some embodiments, the crosslinked polyionic liquid is in the form of a closed cell and open cell sponge form factor. In some embodiments, the crosslinked polyionic liquid is in the form of a mesoporous submicron and micron high/medium density closed cell and open cell sponge form factor.

In some embodiments, R is $C_{2-10}$ alkyl. In some embodiments, R is $C_{2-6}$ alkyl. In some embodiments, R is $C_1$ alkyl. In some embodiments, R is $C_2$ alkyl. In some embodiments, R is $C_3$ alkyl. In some embodiments, R is $C_4$ alkyl. In some embodiments, R is $C_5$ alkyl. In some embodiments, R is $C_6$ alkyl.

In some embodiments, R is $C_{2-6}$ alkyl substituted with $R^1$. In some embodiments, R is $C_1$ alkyl substituted with $R^1$. In some embodiments, R is $C_2$ alkyl substituted with $R^1$. In some embodiments, R is $C_3$ alkyl substituted with $R^1$. In some embodiments, R is $C_4$ alkyl substituted with $R^1$. In some embodiments, R is $C_5$ alkyl substituted with $R^1$. In some embodiments, R is $C_6$ alkyl substituted with $R^1$.

In some embodiments, $R^1$ is phenyl. In some embodiments, $R^1$ is —O-phenyl. In some embodiments, $R^1$ is —OC(=O)$CH_3$. In some embodiments, $R^1$ is —SC(=O)$CH_3$. In some embodiments, $R^1$ is

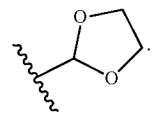 [SMILES: *C1OCCO1]

In some embodiments, X is Br. In some embodiments, X is SCN. In some embodiments, X is bis((trifluoromethyl)sulfonyl) amide.

In some embodiments, n is 0. In some embodiments, n is 1. In some embodiments, n is 3. In some embodiments, n is 5. In some embodiments, m is 10-900. In some embodiments, m is 10-700. In some embodiments, m is 10-600. In some embodiments, m is 10-500. In some embodiments, m is 2-4. In some embodiments, m is 10-400.

In some embodiments, p is 300-1000. In some embodiments, p is 400-1000. In some embodiments, p is 400-900. In some embodiments, p is 400-800. In some embodiments, p is 500-700. In some embodiments, p is 600-1000.

In some embodiments, the crosslinked polyionic liquid is D[VImC6]Br Polymer, Porous PIL P(3DVB-[VImC2]Br), [VImC4]Br Low crosslinked polymer, or D[VImC6]SCN Polymer.

Sorbent

Provided herein are $SO_2$ sorbing materials comprising the crosslinked polyionic liquid of Formula I:

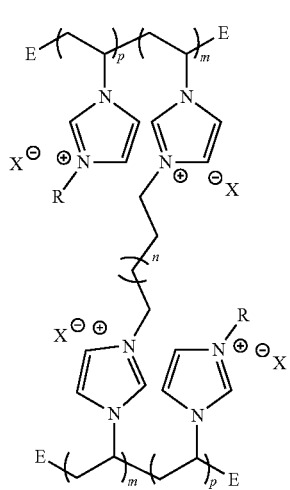

wherein:
 each E is independently a polymer end group;
 R is $C_{2-6}$ alkyl optionally substituted with $R^1$;
 $R^1$ is phenyl, —O-phenyl, —OC(=O)$CH_3$, —SC(=O)$CH_3$, or

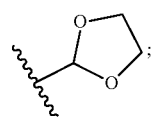

each X is independently Br, bis((trifluoromethyl)sulfonyl) amide, or SCN;
 n is 0, 1, 3, or 5;
 each m is independently 10-1000; and
 each p is independently 0-1000;

wherein the crosslinked polyionic liquid is a random copolymer.

Also provided herein is a sorbent comprising the crosslinked polyionic liquid of Formula I:

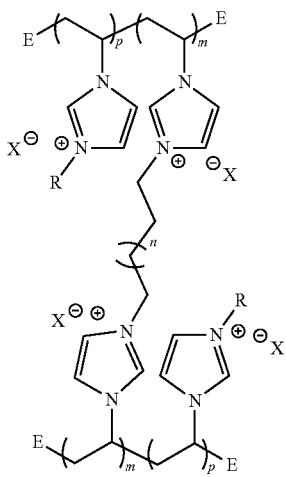

wherein:
each E is independently a polymer end group;
R is $C_{2-6}$ alkyl optionally substituted with $R^1$;
$R^1$ is phenyl, —O-phenyl, —OC(=O)CH$_3$, —SC(=O)CH$_3$, or

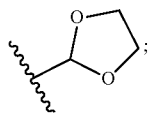 [SMILES: *C1OCCO1]

each X is independently Br, bis((trifluoromethyl)sulfonyl) amide, or SCN;
n is 0, 1, 3, or 5;
each m is independently 10-1000; and
each p is independently 0-1000;
wherein the crosslinked polyionic liquid is a random copolymer, and wherein the sorbent has a $SO_2/CO_2$ selectivity of at least about 3.

In some embodiments, the sorbent has a $SO_2/CO_2$ selectivity of at least about 10, at least about 50, at least about 100, or at least about 500. In some embodiments, the sorbent has a $SO_2/N_2$ selectivity of at least about 10, at least about 50, at least about 100, or at least about 500. In some embodiments, the sorbent has a $SO_2/CH_4$ selectivity of at least about 10, at least about 50, at least about 100, or at least about 200.

In some embodiments, the sorbent has a $CO_2$ uptake capacity of about 0.1 mg/g to about 1 mg/g, about 1 mg/g to about 10 mg/g, or about 10 mg/g to about 50 mg/g. In some embodiments, the sorbent has a $N_2$ uptake capacity of about 0.1 mg/g to about 1 mg/g, about 1 mg/g to about 10 mg/g, or about 10 mg/g to about 50 mg/g.

In some embodiments, the crosslinked polyionic liquid is stacked and utilized in a sorption column to improve the capacity of $SO_2$ sorption, and the rate of the sorption for the mass transfer of the gases.

In some embodiments, the crosslinked polyionic liquids can be in the form of fibers packed in a fiber vessel to create a large surface/volume ratio. Fiber can be multiple layer: crosslinked polyionic liquids for the core and porous PDMS (polydimethylsiloxane) shell for structural strength. Fiber can be metallic fibers coated with the crosslinked polyionic liquids. In some embodiments, the crosslinked polyionic liquids are using to coat rings. The rings can be Raschig rings, Lessing rings, Bialecki rings, Dixon rings, or Pall rings.

In some embodiments, the crosslinked polyionic liquid is in the form of microporous beads. In some embodiments, the crosslinked polyionic liquid is in the form of a micron size mesoporous particle that creates channels for improving the mass transfer of the gas by means of freeze drying. In some embodiments, the crosslinked polyionic liquid is on mesoporous silica, mole sieves, or zeolites to create a form factor, which can be stacked. In some embodiments, the silica is precipitated silica, colloidal silica, or fumed silica.

In some embodiments, the crosslinked polyionic liquids form a thin coating. In some embodiments, the thin coating is a mesoporous thin film coating in a planar form of sheets. In some embodiments, the sorbent comprises mesoporous submicron and micron thin flat sheets coated in the crosslinked polyionic liquid. In some embodiments, the sorbent comprises mesoporous submicron thin flat sheets coated in the crosslinked polyionic liquid. In some embodiments, the sorbent comprises mesoporous micron thin flat sheets coated in the crosslinked polyionic liquid.

In some embodiments, the crosslinked polyionic liquid is blended with polyethylene oxide polymers. In some embodiments, the crosslinked polyionic liquid blended with polyethylene oxide polymers is in the form of a micron size mesoporous particle form factor.

In some embodiments, the crosslinked polyionic liquid further comprises polyethylene oxide. In some embodiments, the crosslinked polyionic liquid comprising polyethylene oxide is in the form of a micron size mesoporous particle form factor. In some embodiments, the crosslinked polyionic liquid comprising polyethylene oxide forms micron to 100 micron size mesoporous composite coatings. In some embodiments, the crosslinked polyionic liquid comprising polyethylene oxide forms sub-micron or micron sized mesoporous beads.

In some embodiments, the crosslinked polyionic liquid is in the form of a closed cell and open cell sponge form factor. In some embodiments, the crosslinked polyionic liquid is in the form of a mesoporous submicron and micron high/medium density closed cell and open cell sponge form factor.

In some embodiments, R is $C_{2-10}$ alkyl. In some embodiments, R is $C_{2-6}$ alkyl. In some embodiments, R is $C_1$ alkyl. In some embodiments, R is $C_2$ alkyl. In some embodiments, R is $C_3$ alkyl. In some embodiments, R is $C_4$ alkyl. In some embodiments, R is $C_5$ alkyl. In some embodiments, R is $C_6$ alkyl.

In some embodiments, R is $C_{2-6}$ alkyl substituted with $R^1$. In some embodiments, R is $C_1$ alkyl substituted with $R^1$. In some embodiments, R is $C_2$ alkyl substituted with $R^1$. In some embodiments, R is $C_3$ alkyl substituted with $R^1$. In some embodiments, R is $C_4$ alkyl substituted with $R^1$. In some embodiments, R is $C_5$ alkyl substituted with $R^1$. In some embodiments, R is $C_6$ alkyl substituted with $R^1$.

In some embodiments, $R^1$ is phenyl. In some embodiments, $R^1$ is —O-phenyl. In some embodiments, $R^1$ is —OC(=O)CH$_3$. In some embodiments, $R^1$ is —SC(=O)CH$_3$. In some embodiments, $R^1$ is

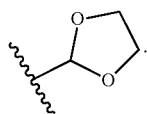 [SMILES: *C1OCCO1]

In some embodiments, X is Br. In some embodiments, X is SCN. In some embodiments, X is bis((trifluoromethyl)sulfonyl) amide.

In some embodiments, n is 0. In some embodiments, n is 1. In some embodiments, n is 3. In some embodiments, n is 5.

In some embodiments, m is 10-900. In some embodiments, m is 10-700. In some embodiments, m is 10-600. In some embodiments, m is 10-500. In some embodiments, m is 2-4. In some embodiments, m is 10-400.

In some embodiments, p is 300-1000. In some embodiments, p is 400-1000. In some embodiments, p is 400-900. In some embodiments, p is 400-800. In some embodiments, p is 500-700. In some embodiments, p is 600-1000.

In some embodiments, the crosslinked polyionic liquid is D[VImC6]Br Polymer, Porous PIL P(3DVB-[VImC2]Br), [VImC4]Br Low crosslinked polymer, or D[VImC6]SCN Polymer.

Definitions

As used herein, "air" refers to the collective gases that constitute earth's atmosphere. Air contains nitrogen, oxygen, argon, carbon dioxide, and water vapor.

Unless otherwise indicated, oxygen-enriched air is considered air with an oxygen content of greater than 21% by volume on a dry basis. Unless otherwise indicated, the use of the term air includes all of the gases listed.

As used herein, "overall recovery of sulfur" or "sulfur recovery" refers to the percentage of sulfur removed based on the amount of sulfur present in the acid gas feed stream. A recovery of 99.0% means that 99.0% of the sulfur in the acid gas feed stream is recovered as part of the recovered sulfur stream.

As used herein, "$SO_2$ selective" refers to $SO_2$ sorbing material, i.e., sorbents/crosslinked polyionic liquids, where $SO_2$ is sorbed selectively over other gases.

As used herein, "$SO_2$ depleted gases" refers to gases that were exposed to $SO_2$ sorbing material. $SO_2$ depleted gases do not comprises $SO_2$ or low-levels of $SO_2$.

As used herein, a polymer is defined as a substance with a molecular structure consisting mostly or entirely of a large number of similar units covalently linked together, i.e., repeating subunits or repeating monomers. A polymer can be a naturally occurring or synthetic substance.

As used herein, a "polymer end group" is a functional group at the terminal ends of the polymer that are not part of the repeating subunits or repeating monomers. Example polymer end groups include, but are not limited to H, OH,

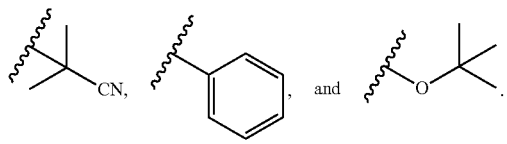

As used herein, a natural rubber (also known as latex, India rubber, Amazonian rubber, caucho or caoutchouc) is defined as naturally occurring polymers comprising mostly isoprene, other minor organic impurities, and water, i.e., polyisoprenes. Natural rubbers are typically harvested as a sticky and milky colloidal substance from rubber trees or other plants.

As used herein, "linear polymers" are defined as polymers whose subunits are arranged in a linear chain.

As used herein, "branched polymers" are defined as polymers whose chains have branching points that connect two or more chain segments. Branching generally occurs by the replacement of a substituent, e.g., a hydrogen atom, on a monomer subunit, by another covalently bonded chain of that polymer or by a chain of another type.

As used herein, "crosslinked polymers" are defined as branched polymers in which adjacent long chains are joined to one another at various positions along their lengths.

The cross-linking creates greater rigidity and stability. The end groups of the crosslinked polymers of the current invention can vary depending on the synthesis procedure.

As used herein, a "homopolymer" is a polymer that contains only a single type of repeating sub-unit or monomer. The end groups of the homopolymers of the current invention can vary depending on the synthesis procedure.

As used herein, a "copolymer" is a polymer containing a mixture of repeating sub-units or monomers.

As used herein, a "random copolymer" is a copolymer in which the probability of finding a given monomeric unit at any given site in the chain is independent of the nature of the adjacent units. The end groups of the random copolymers of the current invention can vary depending on the synthesis procedure. In some embodiments, the compound of Formula I described herein is a random copolymer.

As used herein, a "photo initiator" is a molecule that creates reactive species (free radicals, cations or anions) when exposed to radiation (UV or visible). Example photo initiators include azobisisobutyronitrile, 2,2'-azobis(2-methylpropionamidine) di-hydrochloride, 2,2'-azobis(2-methylpropionitrile), benzoyl peroxide, di-tert-butyl peroxide, dicumyl peroxide, $H_2O_2$, 2-Hydroxy-2-methylpropiophenone, 2,4,6-trimethylbenzoyldiphenyl phosphine oxide, 2,2-dimethoxy-1,2-diphenylethan-1-one, phenylbis(2,4,6-trimethylbenzoyl)phosphine oxide, and bis(f-2,4-cyclopentadien-1-yl)bis[2,6-difluoro-3-(1H-pyrrol-1-yl) phenyl]-titanium.

As used herein, a "redox initiator" is a molecule or complex that creates free radicals in the course of oxidation-reduction reactions. Example redox initiators include $H_2O_2$—$Fe^{2+}$, $Ag^+$—$S_2O_8^{2-}$, $H_2P_2O_8^{-2}$—$Ag^+$, potassium permanganate-malonic acid, and tartaric acid-citric acid.

As used herein, a "blowing agents" is a substance or mixture of substances that is capable of producing a cellular structure via a foaming process in a polymer that undergoes hardening or phase transition. Blowing agents are typically applied when the blown material is in a liquid stage. The cellular structure in a matrix reduces density, increases thermal and acoustic insulation, and increases the relative stiffness of the original polymer. Example blowing agents include (sodium bicarbonate)+(citric acid) Carbonate/Acid Blends (SAFOAM® Endothermic), azodicarbonamide (ADC)+4,4'-oxybis (benzene sulfonyl hydrazide) (OBSH)+ activators zinc stearate, zinc oxide, naphthenate, urea or benzoate.

As used herein, the phrase "optionally substituted" means unsubstituted or substituted. The substituents are independently selected, and substitution may be at any chemically accessible position. As used herein, the term "substituted" means that a hydrogen atom is removed and replaced by a substituent. A single divalent substituent, e.g., oxo, can replace two hydrogen atoms. It is to be understood that substitution at a given atom is limited by valency.

As used herein, the phrase "each 'variable' is independently" means substantially the same as wherein "at each occurrence 'variable' is."

Throughout the definitions, the term "Cn-m" indicates a range, which includes the endpoints, wherein n and m are integers and indicate the number of carbons. Examples include $C_{1-3}$, $C_{1-4}$, $C_{1-6}$, and the like.

As used herein, the term "Cn-m alkyl", employed alone or in combination with other terms, refers to a saturated hydrocarbon group that may be straight-chain or branched, having n to m carbons. Examples of alkyl moieties include, but are not limited to, chemical groups such as methyl (Me), ethyl (Et), n-propyl (n-Pr), isopropyl (iPr), n-butyl, tert-butyl, isobutyl, sec-butyl; higher homologs such as 2-methyl-1-butyl, n-pentyl, 3-pentyl, n-hexyl, 1,2,2-trimethylpropyl, and the like. In some embodiments, the alkyl group contains from 1 to 6 carbon atoms, from 1 to 4 carbon atoms, from 1 to 3 carbon atoms, or 1 to 2 carbon atoms.

The term "about" as used in connection with a numerical value throughout the specification and the claims denotes an interval of accuracy, familiar and acceptable to a person skilled in the art. Such interval of accuracy is, for example, ±10%.

EXAMPLES

Example 1. Monomer Synthesis

Ionic Liquid Divinyl Monomer 1: D[VImC3]Br

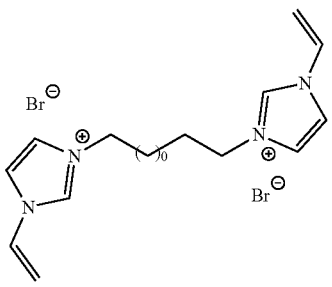

To a round bottom flask containing n-vinyl imidazole (188.23 grams) under dry nitrogen atmosphere is added freshly distilled 1,3-dibromo propane (201.9 grams) drop-wise over a period of 4 hours while stirring continuously. The reaction mixture is refluxed for about 3 hours until consumption of the vinyl imidazole is complete as indicated by TLC. The crude product is washed with diethyl ether to remove any unreacted starting materials. The crude product was recrystallized from dichloromethane (DCM)/diethyl ether or dimethyl ether to yield the D[VImC3]Br (>90%).

Ionic Liquid Divinyl Monomer 2: D[VImC4]Br

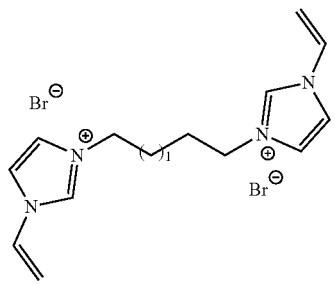

To a round bottom flask n-vinyl imidazole (188.23 grams) under dry nitrogen atmosphere is added freshly distilled 1,4 dibromo butane (215.9 grams) drop-wise over a period of 4 hours while stirring continuously. The reaction mixture is refluxed for about 3 hours until consumption of the vinyl imidazole is complete as indicated by TLC. The crude product is washed with diethyl ether to remove any unreacted starting materials. The crude product is recrystallized from dichloromethane (DCM)/diethyl ether or dimethyl ether to yield D[VImC4]Br (>90%).

Ionic Liquid Divinyl Monomer 3: D[VImC6]Br

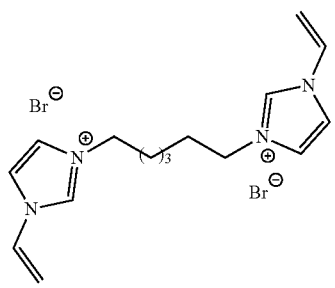

To a round bottom flask containing n-vinyl imidazole (188.23 grams) under dry nitrogen atmosphere was added freshly distilled 1,6-dibromo hexane (244.0 grams) drop-wise over a period of 4 hours while stirring continuously. The reaction mixture was refluxed for about 3 hours until consumption of the vinyl imidazole was complete as indicated by TLC. The crude product was washed with diethyl ether to remove any unreacted starting materials. The crude product was recrystallized from dichloromethane (DCM)/diethyl ether or dimethyl ether to yield D[VImC6]Br (>90%).

Ionic Liquid Divinyl Monomer 4: D[VImC8]Br

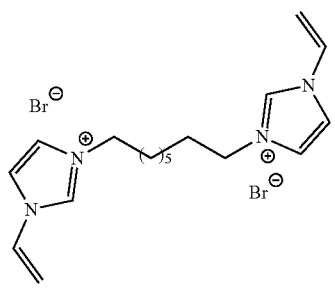

To a round bottom flask containing n-vinyl imidazole (188.23 grams) under dry nitrogen atmosphere is added freshly distilled 1,8-dibromo octane (272.02 grams) drop-wise over a period of 4 hours while stirring continuously.

The reaction mixture is refluxed for about 3 hours until consumption of the vinyl imidazole is complete as indicated by TLC. The crude product is washed with diethyl ether to remove any unreacted starting materials. The crude product is recrystallized from dichloromethane (DCM)/diethyl ether or dimethyl ether to yield D[VImC8]Br (>90%).

Ionic Liquid Divinyl Monomer 5: D[VImC3]SCN

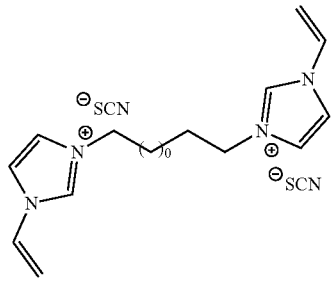

To a solution of D[VImC3]Br (0.2 mol) in acetonitrile (500 mL) is added NH$_4$SCN (0.4 mol). The mixture is allowed to stir at room temperature for 24 hours. The resulting suspension is filtered. The filtrate is distilled at 323 K under reduced pressure. The resulting solid is dried under high vacuum for 36 hours at 333 K to obtain D[VImC3]SCN as a pink powder in a 90% yield.

Ionic Liquid Divinyl Monomer 6: D[VImC4]SCN

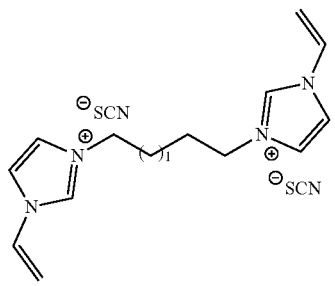

To a solution of D[VImC4]Br (0.2 mol) in acetonitrile (500 mL) is added NH$_4$SCN (0.4 mol). The mixture is allowed to stir at room temperature for 24 hours. The resulting suspension is filtered. The filtrate is distilled at 323 K under reduced pressure. The resulting solid is dried under high vacuum for 36 hours at 333 K to obtain D[VImC4]SCN as a pink powder in a 90% yield.

Ionic Liquid Divinyl Monomer 7: D[VImC6]SCN

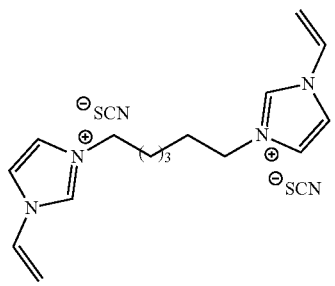

To a solution of D[VImC6]Br (0.2 mol) in acetonitrile (500 mL) was added NH$_4$SCN (0.4 mol). The mixture was allowed to stir at room temperature for 24 hours. The resulting suspension was filtered. The filtrate was distilled at 323 K under reduced pressure. The resulting solid was dried under high vacuum for 36 hours at 333 K to obtain D[VImC6]SCN as a pink powder in a 90% yield.

Ionic Liquid Divinyl Monomer 8: D[VImC8]SCN

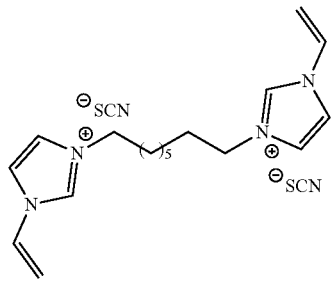

To a solution of D[VImC8]Br (0.2 mol) in acetonitrile (500 mL) is added NH$_4$SCN (0.4 mol). The mixture is allowed to stir at room temperature for 24 hours. The resulting suspension is filtered. The filtrate is distilled at 323 K under reduced pressure. The resulting solid is dried under high vacuum for 36 hours at 333 K to obtain D[VImC8]SCN as a pink powder in a 90% yield.

Ionic Liquid Vinyl Monomer 1: [VImC2]Br

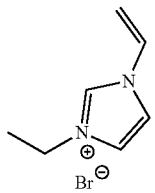

1-Bromoethane (63.6 g, 0.584 mol) was added to solution of 1-vinylimidazole (50.0 g, 0.53 mol) in ethanol (100 mL). The mixture was stirred and refluxed at 333 K for hours. The solid was recrystallized from a concentrated solution of ethyl acetate for three times. The resulting solid was dried at 313 K for 24 hours under vacuum to give [VImC2]Br.

Ionic Liquid Vinyl Monomer 2: [VImC3]Br

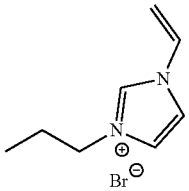

1-Bromopropane (71.8 g, 0.584 mol) is added to solution of 1-vinylimidazole (50.0 g, 0.53 mol) in ethanol (100 mL). The mixture is stirred and refluxed at 333 K for 20 hours. The solid is recrystallized from a concentrated solution of ethyl acetate for three times. The resulting solid is dried at 313 K for 24 hours under vacuum to give [VImC3]Br.

Ionic Liquid Vinyl Monomer 3: [VImC4]Br

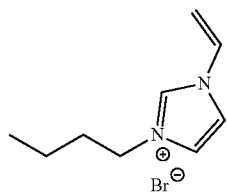

1-Bromobutane (80.0 g, 0.584 mol) was added to solution of 1-vinylimidazole (50.0 g, 0.53 mol) in ethanol (80 mL). The mixture was stirred and refluxed at 333 K for 24 hours. The solid was recrystallized from a concentrated solution of ethyl acetate for three times. The resulting solid was dried at 313 K for 24 hours under vacuum to give [VImC4]Br.

Ionic Liquid Vinyl Monomer 4: [VImC6]Br

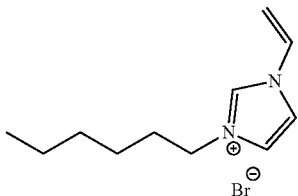

1-Bromohexane (96.3 g, 0.584 mol) is added to solution of 1-vinylimidazole (50.0 g, 0.53 mol) in ethanol (120 mL). The mixture is stirred and refluxed at 333 K for 20 hours. The solid is recrystallized from a concentrated solution of ethyl acetate for three times. The solid is dried at 313 K for 24 hours under vacuum to give [VImC6]Br.

Ionic Liquid Vinyl Monomer 5: [VImC4Ph)Br

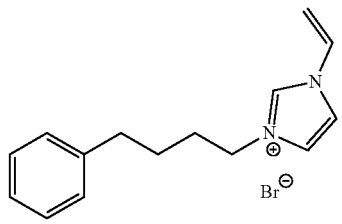

To a solution of 1-vinylimidazole (50.0 g, 0.53 mol) in ethanol (120 mL) is added 4-phenyl-1-bromobutane (124.25 g, 0.584 mol) slowly. The reaction mixture is refluxed at 333 K for 20 hours. The solid is recrystallized from a concentrated ethyl acetate for three times. The resulting solid is dried at 313 K for 24 hours under vacuum to give [VImC4Ph]Br.

Ionic Liquid Vinyl Monomer 6: [VImC4SC(O)Me]Br

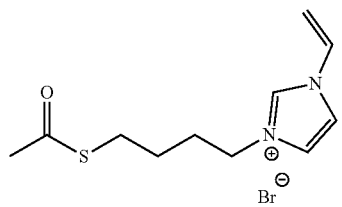

To a solution of 1-vinylimidazole (50.0 g, 0.53 mol) in ethanol (120 mL) is added S-(4-bromobutyl)thioacetate (123.13 g, 0.584 mol) slowly. The reaction mixture is refluxed at 333 K for 20 hours. The solid is recrystallized from a concentrated solution of ethyl acetate for three times. The resulting solid is dried at 313 K for 24 hours under vacuum to give [VImC4SC(O)Me]Br.

Ionic Liquid Vinyl Monomer 7: [VImC3OPh]Br

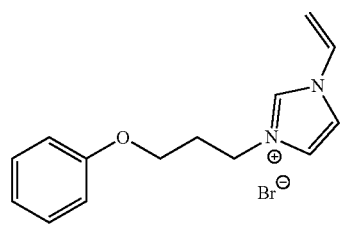

To a solution of 1-vinylimidazole (50.0 g, 0.53 mol) in ethanol (120 mL) is added (3-bromopropoxy) benzene (125.35 g, 0.584 mol) slowly. The reaction mixture is refluxed at 333 K for 20 hours. The solid is recrystallized from a concentrated solution of ethyl acetate for three times. The resulting solid is dried at 313 K for 24 hours under vacuum to give [VImC3OPh]Br.

Ionic Liquid Vinyl Monomer 8: [VImC4OC(O)Me]Br

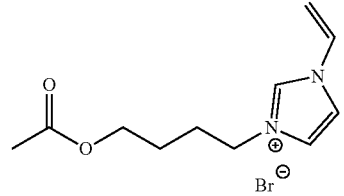

To a solution of 1-vinylimidazole (50.0 g, 0.53 mol) in ethanol (120 mL) is added 4-bromobutyl acetate (113.72 g, 0.584 mol) slowly. The reaction mixture is refluxed at 333 K for 20 hours. The solid is recrystallized from a concentrated solution of ethyl acetate for three times. The resulting solid is dried at 313 K for 24 hours under vacuum to give [VImC4OC(O)Me]Br.

Ionic Liquid Vinyl Monomer 9: [VImC4Do]Br

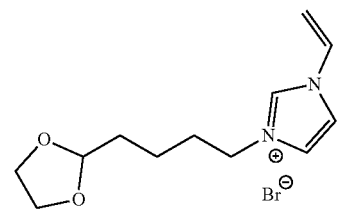

To a solution of 1-vinylimidazole (50.0 g, 0.53 mol) in ethanol (120 mL) was added 2-(4-bromobutyl)-1-3-dioxane (130.01 g, 0.584 mol) slowly. The reaction mixture was refluxed at 333 K for 20 hours. The solid was recrystallized from a concentrated solution of ethyl acetate for three times. The resulting solid was dried at 313 K for 24 hours under vacuum to give [VImC4Do]Br.

Ionic Liquid Vinyl Monomer 10: [VImC5]TFSI

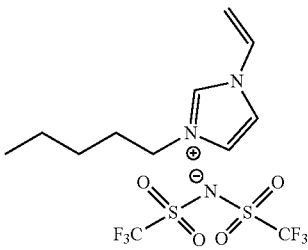

To solution of 1-vinylimidazole (50.0 g, 0.53 mol) in ethanol (120 mL) is added 1-pentylbromide (88.06 g, 0.584 mol). The mixture is refluxed at 333 K for 20 hours. To the mixture is added lithium bis((trifluoromethyl)sulfonyl) amide (157.85 g, 0.55 mol) in ethanol (120 mL). The mixture stirred for 5 hours at room temperature and then refluxed at 333 K for 20 hours. The solid is recrystallized from a concentrated solution of ethyl acetate for three times. The resulting solid is dried at 313 K for 24 hours under vacuum to give [VImC5]TFSI.

Example 2. Polymerization by Photopolymerization

Procedure A:
An ionic liquid vinyl monomer, an ionic liquid divinyl monomer (3 wt. % to 5 wt. % of ionic liquid vinyl monomer), and photo initiator (0.3 wt. % to 0.5 wt. % of ionic liquid vinyl monomer) were dissolved in deionized water. The solution was irradiated at room temperature with a UV light source at 365 nm for at least 10 minutes to produce a crosslinked polyionic liquid.
Procedure B:
An ionic liquid vinyl monomer and photo initiator (0.3 wt. % to 0.5 wt. % of ionic liquid vinyl monomer) were dissolved in deionized water. The solution was irradiated at room temperature with a UV light source at 365 nm for at least 10 minutes to produce a polyionic liquid.

Example 3. Polymerization to Films by Photopolymerization

General Procedure: Nano-Porous Thin Films
An ionic liquid vinyl monomer, an ionic liquid divinyl monomer (3 to 5 wt. % of ionic liquid vinyl monomer), and photo initiator (0.3 wt. % to 0.5 wt. % of ionic liquid vinyl monomer) are dissolved in deionized water. The solution was made into a thin layer (1 μm or thinner) and is irradiated at room temperature with a UV light source at 365 nm for at least 10 minutes. The resulting polymer thin film is rinsed with solvent, e.g. hexane and water, to remove any unreacted monomer. The coated sheets were soaked in deionized water and then freeze dried.
General Procedure: Thick Porous Coatings
An ionic liquid vinyl monomer, an ionic liquid divinyl monomer (3 to 5 wt. % of ionic liquid vinyl monomer), and photo initiator (0.3 wt. % to 0.5 wt. % of ionic liquid vinyl monomer) were dissolved in deionized water. The solution is made into a layer (10 μm or 100 μm) and is irradiated at room temperature with a UV light source at 365 nm for at least 30 minutes. The resulting polymer coated sheets is rinsed with solvent, e.g. hexane and water, to remove any unreacted monomer. The coated sheets were freeze dried.

Example 4. Polymerization to Microporous Beads by Photopolymerization

General Procedure
An ionic liquid vinyl monomer, an ionic liquid divinyl monomer (3 to 5 wt. % of ionic liquid vinyl monomer), and photo initiator (0.3 wt. % to 0.5 wt. % of ionic liquid vinyl monomer) are dissolved in deionized water. The solution is irradiated at room temperature with a UV light source at 365 nm. After the completion of the polymerization, a colloidal silica is dispersed into the solution. Alternatively, colloidal silica is mixed with an ionic liquid vinyl monomer, an ionic liquid divinyl monomer (3 to 5 wt. % of ionic liquid vinyl monomer), and photo initiator (0.3 wt. % to 0.5 wt. % of ionic liquid vinyl monomer). This resulting dispersion is irradiated at room temperature with a UV light source at 365 nm to form a dispersion of colloidal silica and polymerized ionic liquid. The dispersed colloidal silica and polymerized ionic liquid is extruded through an orifice of an extrusion die through a 90-degree mixing junction extrusion die forming a spherical bead morphology. Two types of fluids were injected into the 90-degree junction die. The first fluid is a continuous phase of silicone oil or surfactant of a different surface energy density. The second fluid comprises polymerized ionic liquid fluid in a deionized water. The bead size of the ionic liquid can be adjusted by controlling the process parameters such as flow rate and temperature of the extrusion die. After formation of the beads, the microporous beads were rinsed with solvent, e.g. hexane and water, to remove any unreacted monomers. The beads were soaked in water and then freeze dried.

Example 5. Polymerization by Redox Polymerization

Procedure A:
An ionic liquid vinyl monomer and an ionic liquid divinyl monomer were dissolved in deionized water. Nitrogen is bubbled through the solution for 30 minutes. To the solution at room temperature is added a redox initiator (0.2% to 0.5 wt. % of ionic liquid vinyl monomer) in deionized water slowly to produce a crosslinked polyionic liquid. Polymerization will be initiated after addition of redox initiator and the temperature of the solution starts increasing due to heat of polymerization. Polymerization reaches completion after the temperature reaches steady state.
Procedure B:
An ionic liquid divinyl monomer is dissolved in deionized water. Nitrogen is bubbled through the solution for 30 minutes. To the solution at room temperature is added a redox initiator (0.2% to 0.5 wt. % of ionic liquid vinyl monomer) in deionized water slowly to produce a polyionic liquid.
Example redox initiators include: $H_2O_2$—$Fe^{2+}$ redox system, $Ag^+$—$S_2O_8{}^{2-}$ redox pair, $H_2P_2O_8{}^{-2}$ (peroxidiphosphate) —$Ag^+$ redox system, potassium permanganate-malonic, acid or tartaric acid and citric acid redox system Example 6. Polymerization to Microporous Beads by Redox Polymerization: Example Dissolve 200 g D[VImCn]Br or D[VImCn]SCN in 500 mL deionized water and nitrogen to be bubbled for 30 mins to remove dissolved oxygen from the solution. Slowly add a redox initiator as mentioned earlier (0.2% to 0.5 wt. % of monomer) to the solution in deionized water at room temperature. [Redox initiators can be $H_2O_2$—$Fe^{2+}$ redox system or $Ag^+$—$S_2O_8^{-2}$ redox pair or $H_2P_2O_8^{-2}$ (peroxidiphosphate) —$Ag^+$ redox system or potassium permanganate-malonic, acid or tartaric acid and citric acid redox system etc.]Polymerization will be initiated after addition of redox initiator and the temperature of the solution starts increasing due to heat of polymerization. Polymerization reaches completion after the temperature reaches steady state.

Example 7. Polymerization to Microporous Beads by Redox Polymerization

General Procedure

An ionic liquid vinyl monomer and an ionic liquid divinyl monomer (3 to 5 wt. % of ionic liquid vinyl monomer) are dissolved in deionized water. Nitrogen is bubbled through the solution for 30 minutes. To the solution at room temperature is added a redox initiator (0.2% to 0.5 wt. % of ionic liquid vinyl monomer) in deionized water slowly. After the completion of the polymerization, a colloidal silica is dispersed into the solution. The dispersion of dispersed colloidal silica and polymerized ionic liquid is extruded through an orifice of an extrusion die through a 90-degree mixing junction extrusion die forming a spherical bead morphology. Two types of fluids were injected into the 90-degree junction die. The first fluid is a continuous phase of silicone oil or surfactant of a different surface energy density. The second fluid comprises polymerized ionic liquid fluid in a deionized water or dispersion of dispersed colloidal silica in polymerized ionic liquid. The bead size of the ionic liquid can be adjusted by controlling the process parameters such as flow rate and temperature of the extrusion die. After formation of the beads, the microporous beads were rinsed with solvent, e.g. hexane and water, to remove any unreacted monomers. The beads were soaked in water and then freeze dried.

Example 8. Polymerization and Synthesis of Poly 1-Vinyl-3-(n) alkyl imidazolium bromide ([VImnA] Br) (n=3, 4, 6, 8) (nA=alkyl) ILs Microporous Beads Poly 1-Vinyl-3-(n) alkyl imidazolium bromide ([VImnA] Br) (n=3, 4, 6, 8) (nA=alkyl) crosslinked with D[VImC6] Br or/D[VImC4] Br was synthesized as follows:

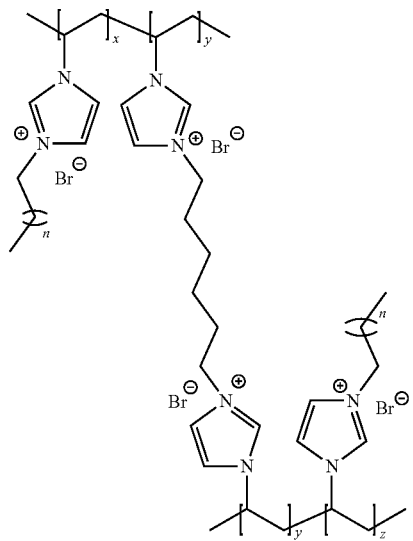

[PolyXIL of Crosslinked Poly 1-Vinyl-3-(n) alkyl imidazolium bromide ([VImnA] Br) (n 3, 4, 6, 8) with [I-Vinyl-3-(n) alkyl imidazolium bromide] ([VImnA] Br), crosslinker D[VImC6] Br or D[VImC4] Br]

Photopolymerization of Poly 1-Vinyl-3-(n) alkyl imidazolium bromide ([VImnA] Br) (n=3, 4, 6, 8)

P([VnAIm] Br) microporous beads can be synthesized as follows. 25 g of monomer [1-Vinyl-3-(n) alkyl imidazolium bromide] ([VImnA] Br), crosslinker D[VImC6] Br or/D [VImC4] Br (3 to 5 wt. % of monomer), and photo-initiator AIBA (0.3 wt. % of monomer and crosslinker) were dissolved in 50 mL deionized water. Photo initiator 2,2'-azobis [2 methylpropionamidine] dihydrochloride (0.3 wt. % of monomer) or different suitable photo initiator, e.g. dibenzoyl peroxide (0.3 wt. % of monomer) in 50 mL deionized water was added. The photo polymerization reaction was carried out in a transparent glass flat rectangular reactor with 365 nm ultraviolet light for 30 min.

In other version after completion of polymerization, a colloidal silica e.g. CAB-O-SPERSE dispersions e.g. CAB-O-SPERSE 1030-K or/CAB-O-SPERSE 2020-K etc./or AERODISP 7720 (AEROSIL dispersions) from 1 wt. % to 20 wt. % is dispersed with the polymerized ionic liquid solution in water to impart structural integrity, which can also be extruded in a form of microbeads.

After the completion of the polymerization, the polymerized ionic liquid (or dispersed colloidal silica+polymerized ionic liquid) was extruded through an orifice of an extrusion die through a 90-degree mixing junction extrusion die. In the 90-degree mixing junction extrusion die, two types of fluids were injected in the 90-degree junction die. The first fluid was a continuous phase of silicone oil or surfactant of different surface energy density, and the second fluid was in dispersed phase and was fed in the 90-degree junction die consisting of polymerized ionic liquid fluid in a deionized water. Due to different surface energy density of the continuous phase and due to shear forces at the junction point of the two liquids, the polyionic liquid minimizes the energy by forming a spherical bead morphology. At this stage, the polymerized ionic liquid formed spherical shape beads of micron size. Bead size of the ionic liquid was adjusted by controlling the process parameters, such as e.g., flow rate and temperature of the extrusion die. After formation of these beads, these microporous beads were rinsed with solvent e.g. hexane and water several times to remove any unreacted monomers. After the removal of any cross-linked polyionic liquid from spherical micron size bead, these beads were soaked in water and then freeze dried. This freeze-drying process resulted in micro-porous beads of polyionic liquids. These microporous beads were packed with composite support, which were arranged in the sorption tower for the selective sorption of the $SO_2$ from a tail gas. Redox polymerization of Poly 1-Vinyl-3-(n) alkyl imidazolium bromide ([VImnA]Br) (n=3, 4, 6, 8)

P([VImnA]Br) microporous beads can be synthesized as follows.

25 g of monomer [1-Vinyl-3-(n) alkyl imidazolium bromide] ([VImnA] Br) and crosslinker D[VImC6] Br or D[VImC4] Br (3 to 5 wt. % of monomer), (Ionic liquid vinyl monomer) are dissolved in 100 mL deionized water and nitrogen is bubbled for 30 mins to remove dissolved oxygen from the solution. A redox initiator as mentioned earlier (0.2% to 0.5 wt. % of monomer) is slowly added to the solution in deionized water at room temperature. [Redox initiators can be $H_2O_2$—$Fe^{2+}$ redox system or $Ag^+$—$S_2O_8^{+2}$—redox pair or $H_2P_2O_8^{-2}$ (peroxidiphosphate) —$Ag^+$ redox system or potassium permanganate-malonic, acid or tartaric acid and citric acid redox system etc.] Polymerization is initiated after addition of redox initiator and the temperature of the solution starts increasing due to heat of polymerization. Polymerization reaches completion after the temperature reaches steady state.

Micro-porous bead formation of Poly 1-Vinyl-3-(n) alkyl imidazolium bromide ([V(n)nAIm] Br) (n=3, 4, 6, 8)

In other version, after completion of polymerization of this polyionic liquids, a colloidal silica e.g. CAB-O-SPERSE dispersions e.g. CAB-O-SPERSE 1030-K or/CAB-O-SPERSE 2020-K etc./or AERODISP 7720 (AEROSIL dispersions) from 1 wt. % to 20 wt. % are dispersed with into the polymerized ionic liquid solution in water to impart structural integrity, which can also be extruded in a form of micro-beads.

After the completion of the polymerization, the polymerized ionic liquid (or dispersed colloidal silica+polymerized ionic liquid) was extruded through an orifice of an extrusion die through a 90-degree mixing junction extrusion die. In the 90-degree mixing junction extrusion die, two types of fluids were injected in the 90-degree junction die. The first fluid was a continuous phase of silicone oil or surfactant of different surface energy density, and the second fluid was in dispersed phase and was fed in the 90-degree junction die consisting of polymerized ionic liquid fluid in a deionized water. Due to different surface energy density of the continuous phase and due to shear forces at the junction point of the two liquids, the polyionic liquid minimizes the energy by forming a spherical bead morphology. At this stage, the polymerized ionic liquid formed spherical shape beads of micron size. Bead size of the ionic liquid was adjusted by controlling the process parameters, such as e.g., flow rate and temperature of the extrusion die. After formation of these beads, these microporous beads were rinsed with solvent e.g. hexane and water several times to remove any unreacted monomers. After the removal of any crosslinked polyionic liquid from spherical micron size bead, these beads were soaked in water and then freeze dried. This freeze-drying process resulted in micro-porous beads of polyionic liquids. These microporous beads were packed with composite support, which were arranged in the sorption tower for the selective sorption of the $SO_2$ from a tail gas.

Example 9. Formation of Polymeric Nanoporous Closed Cell Sponge Systems

A blowing agent was added to a molten polymer and is decomposed to release gas. The polymer is foamed by pressuring and heating. In case of reinforced polymer foam, a reinforcing agent such as zeolite or fumed silica is dispersed in the blowing agent and polymer.

Figure 4:
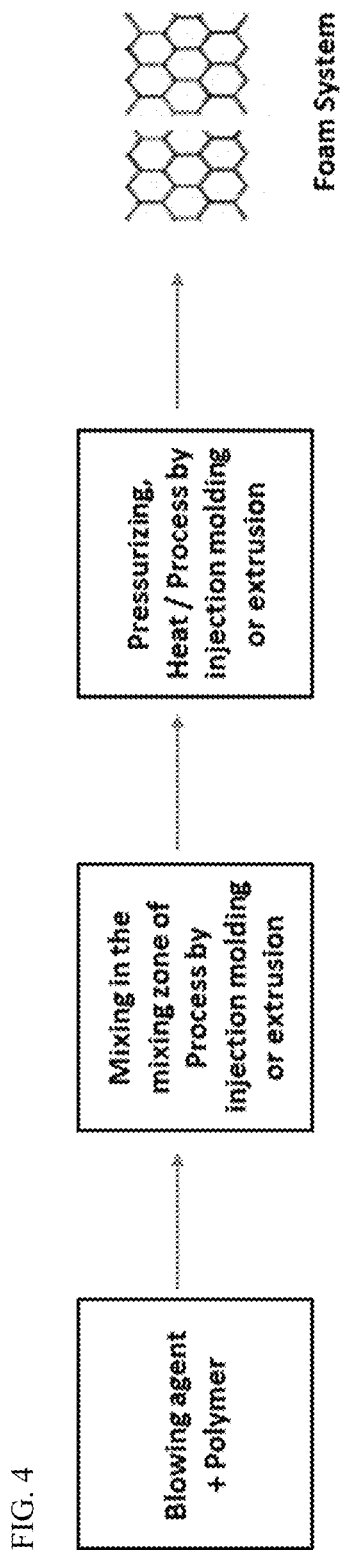
FIG. 4 is a schematic formation of polymeric foam systems.
Figure 5:
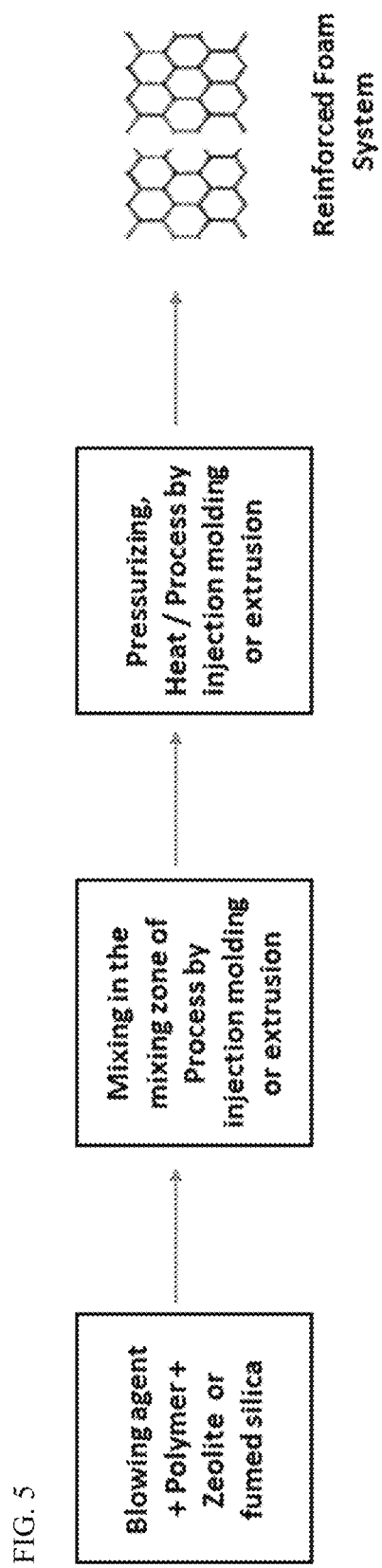
FIG. 5 is a schematic formation of reinforced polymeric foam systems.

Example 10. Polyionic Liquids as Open Cell and Closed Cell Foam Factors which can be Utilized in the Sorption Tower $SO_2$ selective crosslinked Polyionic Liquids can also be utilized as open cell and closed cell foam factors in the sorption tower. FIG. 4 illustrates schematics of the formation of polymeric foam systems. FIG. 5. shows a schematic diagram of polymeric foam systems. The chemical foaming process can be undertaken by following method. The method is as follows: A blowing agent is added to a molten polymer and is decomposed to release gas. Then, the polymer is foamed by pressuring and heating, as shown in above schemes. In case of reinforced polymer foam reinforcing agent such as zeolite or fumed silica can be dispersed for the reinforcement.

Example 11. Formation of PolyXIL (Poly Crosslinked Ionic Liquids) Microporous Foam as Different Form Factors Formation of PolyXIL microporous Foam as different form factors form factors as sheet, composite coated sheets or microporous beads. Crosslinked PolyXIL's are stable at 300° C. so foams can be generated from them by chemical blowing agents with a control porosity to facilitate mass transfer of gases.

Method 1:

Blowing agents utilized to form PolyXIL microporous foams can be (sodium bicarbonate)+(citric acid) Carbonate/Acid Blends (SAFOAM® Endothermic): Creates $CO_2$ and water, absorbs heat to create closed cell foams to fabricate microporous foams to of micron or submicron size. Foams can be formed from 170° C. to 210° C. Sodium bicarbonate starts to decompose at around 160° C., while citric acid only starts decomposing at around 210° C. The decomposition process typically yields 120 $cm^3/g$ gas. The foam can be manufactured either with an injection molding or with extrusion of the polymer and blowing agent with appropriate process parameter to control the pore size and other structural properties of the of the foam.

Method 2:

Blowing agents utilized to form PolyXIL microporous foams can also be Azodicarbonamide (ADC)+4,4'-oxybis (benzene sulfonyl hydrazide) (OBSH)+activators zinc stearate, zinc oxide, naphthenate, urea or benzoate to process and form foam at much lower temperatures up to 40° C.: Creates Nitrogen and Ammonia, generates heat upon decomposition. Its decomposition products are nitrogen ($N_2$) 65%, carbon monoxide (CO) 24%, carbon dioxide ($CO_2$) 5% and ammonia ($NH_3$) 5%. The decomposition process typically yields 220 $cm^3/g$ gas. The foam can be manufactured either with an injection molding or extrusion of the polymer and blowing agent with appropriate process parameter to control the pore size and other structural properties of the of the foam.

PolyXIL foams can be fabricated in many ways (extrusion foaming, injection molding foam, bead forming & foaming, and by application of supercritical $CO_2$) into a desired form factors as thin porous sheets or composite structures.

Example 12. Sorption and Desorption of $SO_2$

Figure 2:
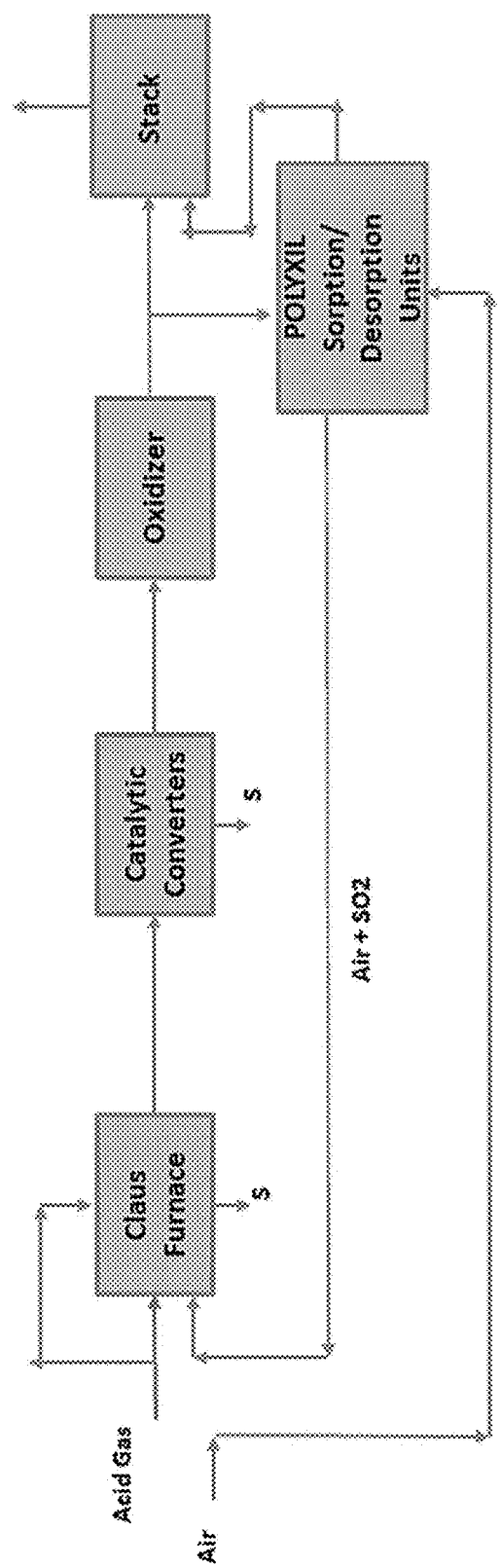
FIG. 2 is a diagram of a process for a sulfur recovery unit including a Claus furnace and a crosslinked polyionic liquid sorption/desorption unit.
Figure 3:
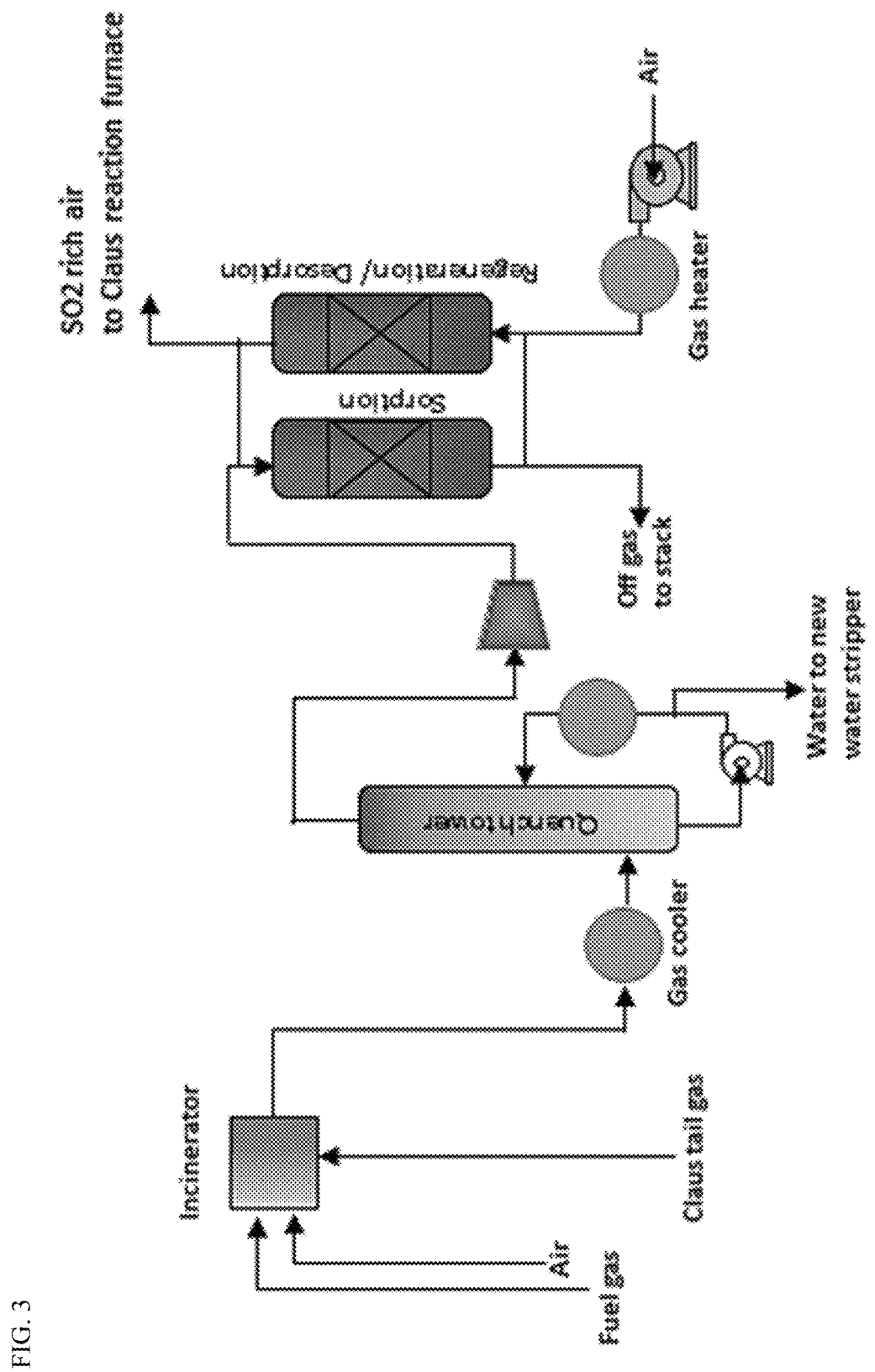
FIG. 3 is a diagram of a process for a sulfur recovery unit including a crosslinked polyionic liquid sorption/desorption unit.

The disclosed process is shown in FIG. 2. Table 12.1 shows $SO_2$ sorption capacity and $CO_2$ sorption capacity data for different crosslinked polyionic liquid polymers.

TABLE 12.1

| Sorption material | $SO_2$ sorption capacity mg $g^{-1}$ | $CO_2$ sorption capacity mg $g^{-1}$ | Selectivity $SO_2/CO_2$ |
|---|---|---|---|
| D[VImC6]Br Polymer | 498 | 0.81 | 614 |
| Porous PIL P(3DVB-[VImC2]Br) | 343 | 21.4 | 16 |
| [VImC4]Br Low crosslinked polymer | 514 | 5.8 | 88.6 |
| D[VImC6]SCN Polymer | 489 | 1.08 | 452 |

Table 12.2 shows CH₄ sorption capacity and N₂ sorption capacity data for different crosslinked polyionic liquid polymers.

TABLE 12.2

| Sorption material | $CH_4$ sorption capacity mg g$^{-1}$ | $N_2$ sorption capacity mg g$^{-1}$ | Selectivity $SO_2/CH_4$ | Selectivity $SO_2/N_2$ |
|---|---|---|---|---|
| D[VImC6]Br Polymer | 0.254 | 0.101 | 1960 | 4930 |
| D[VImC6]SCN Polymer | 0.287 | 0.118 | 1704 | 4144 |

Desorption of $SO_2$ occurs at 80° C. with partial vacuum for 1 hour. Breakthrough of $SO_2$ for gas mixture containing $SO_2$ and $CO_2$ occurs in 65 minutes at 1 bar and 25° C., e.g. for 2000 ppm of $SO_2$ reproducible over multiple cycles.

A number of implementations have been described. Nevertheless, it will be understood that various modifications may be made without departing from the spirit and scope of the disclosure.

What is claimed is:

1. A method for removing $SO_2$ from a sulfur recovery unit (SRU) tail gas stream, comprising:
   a) introducing the SRU tail gas stream to an oxidizer to produce a sorbent feed;
   b) introducing the sorbent feed to a sorbent structure comprising a $SO_2$ selective crosslinked polyionic liquid;
   c) allowing the sorbent feed to contact a feed side of the sorbent such that the $SO_2$ is sorbed, and the portion of the sorbent feed that is not sorbed forms $SO_2$ depleted gases;
   d) collecting the $SO_2$ depleted gases to produce a stack feed;
   e) supplying hot air or nitrogen to the sorbent to produce a $SO_2$ rich stream; and
   f) sending the $SO_2$ rich stream to the SRU;
wherein the crosslinked polyionic liquid is a random copolymer of Formula I:

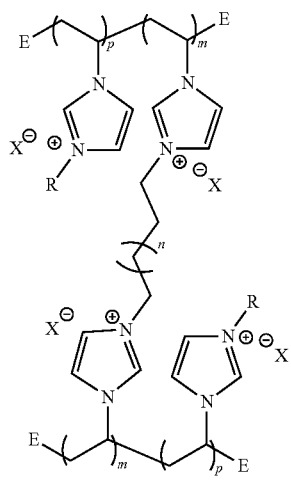

wherein:
   each E is a polymer end group;
   R is $C_{2-6}$ alkyl optionally substituted with $R^1$;
   $R^1$ is phenyl, —O-phenyl, —OC(═O)CH₃, —SC(═O)CH₃, or

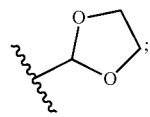

each X is independently Br, bis((trifluoromethyl)sulfonyl) amide, or SCN;
   n is 0, 1, 3, or 5;
   each m is independently 10-1000; and
   each p is independently 0-1000.

2. The method of claim 1, wherein the tail gas stream comprises $CO_2$, $H_2O$, $N_2$, and $O_2$.

3. The method of claim 1, wherein the sorbent has a $SO_2/CO_2$ selectivity of at least about 50.

4. The method of claim 1, wherein the sorbent has a $SO_2/N_2$ selectivity of at least about 100.

5. The method of claim 1, wherein the sorbent has a $SO_2/CH_4$ selectivity of at least about 100.

6. The method of claim 1, wherein the crosslinked polyionic liquid is in the form of microporous beads.

7. The method of claim 1, wherein the sorbent comprises mesoporous submicron and micron thin flat sheets coated in the crosslinked polyionic liquid.

8. The method of claim 1, wherein the crosslinked polyionic liquid is blended with polyethylene oxide polymers.

9. The method of claim 1, wherein the crosslinked polyionic liquid further comprises polyethylene oxide.

10. The method of claim 1, wherein the crosslinked polyionic liquid is D[VImC6]Br Polymer, Porous PIL P(3DVB-[VImC2]Br), [VImC4]Br Low crosslinked polymer, or D[VImC6]SCN Polymer.

11. A system for removing $SO_2$ from a sulfur recovery unit (SRU) tail gas stream, comprising:
   a) a sorbent feed generated from oxidation of the SRU tail gas stream;
   b) a sorbent structure comprising a $SO_2$ selective crosslinked polyionic liquid;
   c) a stack feed comprising the SRU tail gas component depleted in $SO_2$ gases;
   d) a hot air supply to the sorbent that forms a $SO_2$ rich stream; and
   e) an SRU to receive the $SO_2$ rich stream;
wherein the crosslinked polyionic liquid is a random copolymer of Formula I:

wherein:
each E is independently a polymer end group;
R is $C_{2-6}$ alkyl optionally substituted with $R^1$;
$R^1$ is phenyl, —O-phenyl, —OC(=O)CH$_3$, —SC(=O)CH$_3$, or

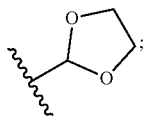 [SMILES: *C1OCCO1]

each X is independently Br, bis((trifluoromethyl)sulfonyl)amide, or SCN;
n is 0, 1, 3, or 5;
each m is independently 10-1000; and
each p is independently 0-1000.

12. The system of claim 11, wherein the tail gas stream comprises $CO_2$, $H_2O$, $N_2$, and $O_2$.

13. The system of claim 11, wherein the sorbent has a $SO_2/CO_2$ selectivity of at least about 50.

14. The system of claim 11, wherein the sorbent has a $SO_2/N_2$ selectivity of at least about 100.

15. The system of claim 11, wherein the sorbent has a $SO_2/CH_4$ selectivity of at least about 100.

16. The system of claim 11, wherein the crosslinked polyionic liquid is in the form of microporous beads.

17. The system of claim 11, wherein the sorbent comprises mesoporous submicron and micron thin flat sheets coated in the crosslinked polyionic liquid.

18. The system of claim 11, wherein the crosslinked polyionic liquid is blended with polyethylene oxide polymers.

19. The system of claim 11, wherein the crosslinked polyionic liquid further comprises polyethylene oxide.

20. The system of claim 11, wherein the crosslinked polyionic liquid is D[VImC6]Br Polymer, Porous PIL P(3DVB-[VImC2]Br), [VImC4]Br Low crosslinked polymer, or D[VImC6]SCN Polymer.

* * * * *